United States Patent
Yoganandan et al.

(10) Patent No.: US 11,221,823 B2
(45) Date of Patent: Jan. 11, 2022

(54) SYSTEM AND METHOD FOR CONTEXT-BASED INTERACTION FOR ELECTRONIC DEVICES

(71) Applicant: Samsung Electronics Co., Ltd., Suwon-si (KR)

(72) Inventors: Arun Rakesh Yoganandan, San Francisco, CA (US); Kumi Akiyoshi, San Francisco, CA (US); Tais C. Mauk, San Francisco, CA (US); Chang Long Zhu Jin, Sunnyvale, CA (US); Jung Won Hong, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 15/857,301

(22) Filed: Dec. 28, 2017

(65) Prior Publication Data
US 2018/0336009 A1 Nov. 22, 2018

Related U.S. Application Data

(60) Provisional application No. 62/509,600, filed on May 22, 2017.

(51) Int. Cl.
*G06F 3/16* (2006.01)
*G10L 15/08* (2006.01)
(Continued)

(52) U.S. Cl.
CPC ............. *G06F 3/167* (2013.01); *G06F 3/017* (2013.01); *G06F 3/0304* (2013.01); *G06F 3/0346* (2013.01); *G06F 3/0482* (2013.01); *G06F 3/04842* (2013.01); *G06F 3/04845* (2013.01); *G06F 3/04883* (2013.01); *G10L 15/08* (2013.01); *G10L 15/1815* (2013.01); *G06F 2203/0381* (2013.01); *G10L 2015/228* (2013.01)

(58) Field of Classification Search
CPC ................. G10L 15/08; G10L 15/1815; G10L 2015/228; G06F 2203/0381
See application file for complete search history.

(56) References Cited

U.S. PATENT DOCUMENTS 9,103,691 B2    8/2015  Waller et al.
9,165,406 B1 *  10/2015 Gray .................. G06K 9/00456
(Continued)

FOREIGN PATENT DOCUMENTS

JP    2017054064 A    3/2017
KR    20160147012 A   12/2016

OTHER PUBLICATIONS

International Search Report and Written Opinion dated Aug. 23, 2018 for International Application PCT/KR2018005851 from Korean Intellectual Property Office, pp. 1-11, Republic of Korea.
(Continued)

*Primary Examiner* — Michelle M Koeth
(74) *Attorney, Agent, or Firm* — Sherman IP LLP; Kenneth L. Sherman; Steven Laut

(57) ABSTRACT

A method includes receiving a voice input at an electronic device. An ambiguity of the voice input is determined. The ambiguity is resolved based on contextual data. The contextual data includes at least one of: an image, a non-voice input comprising a gesture, a pointer of a pointing device, a touch, or a combination thereof.

17 Claims, 23 Drawing Sheets

(51) Int. Cl.
*G06F 3/0488* (2013.01)
*G10L 15/18* (2013.01)
*G06F 3/0484* (2013.01)
*G06F 3/0482* (2013.01)
*G06F 3/01* (2006.01)
*G06F 3/03* (2006.01)
*G10L 15/22* (2006.01)
*G06F 3/0346* (2013.01)

(56) References Cited

U.S. PATENT DOCUMENTS

| | | | |
|---|---|---|---|
| 10,083,688 B2* | 9/2018 | Piernot | G06F 3/167 |
| 2003/0090504 A1* | 5/2003 | Brook | G11B 27/34 |
| | | | 715/716 |
| 2012/0257035 A1 | 10/2012 | Larsen | |
| 2013/0275899 A1* | 10/2013 | Schubert | G06F 3/0481 |
| | | | 715/765 |
| 2014/0058584 A1 | 2/2014 | Weng et al. | |
| 2014/0244259 A1* | 8/2014 | Rosario | G10L 15/19 |
| | | | 704/254 |
| 2014/0282273 A1 | 9/2014 | Anderson | |
| 2014/0355789 A1* | 12/2014 | Bohrarper | H04N 21/4661 |
| | | | 381/119 |
| 2015/0310867 A1 | 10/2015 | Lebeau et al. | |
| 2016/0004301 A1 | 1/2016 | Stachniak et al. | |
| 2016/0091967 A1 | 3/2016 | Prokofieva et al. | |
| 2016/0170710 A1 | 6/2016 | Kim et al. | |
| 2016/0275074 A1* | 9/2016 | Bogdanov | G06F 40/30 |
| 2016/0314788 A1 | 10/2016 | Jitkoff et al. | |
| 2017/0206059 A1* | 7/2017 | Yang | G10L 15/32 |
| 2018/0089501 A1* | 3/2018 | Terekhov | G06K 9/00288 |
| 2018/0167425 A1* | 6/2018 | Leekkala | H04L 67/26 |
| 2019/0011703 A1* | 1/2019 | Robaina | G06F 3/013 |
| 2019/0057696 A1* | 2/2019 | Ogawa | G10L 15/24 |

OTHER PUBLICATIONS

Extended European Search Report dated Mar. 26, 2020 for European Application No. 18806641.9 from European Patent Office, pp. 1-9 Munich, Germany.

* cited by examiner

Instead of this which has limited options →

FIG. 24A
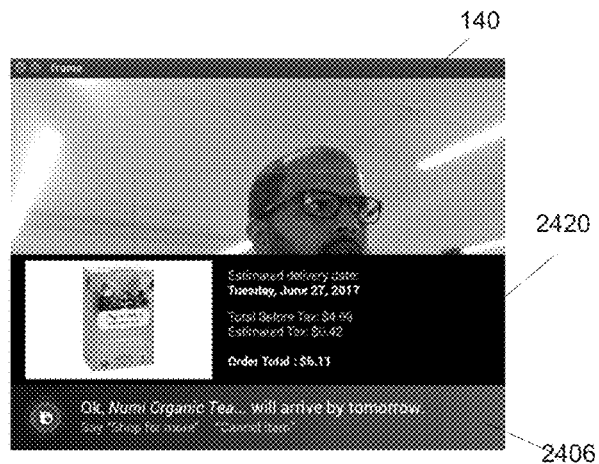
FIG. 24B
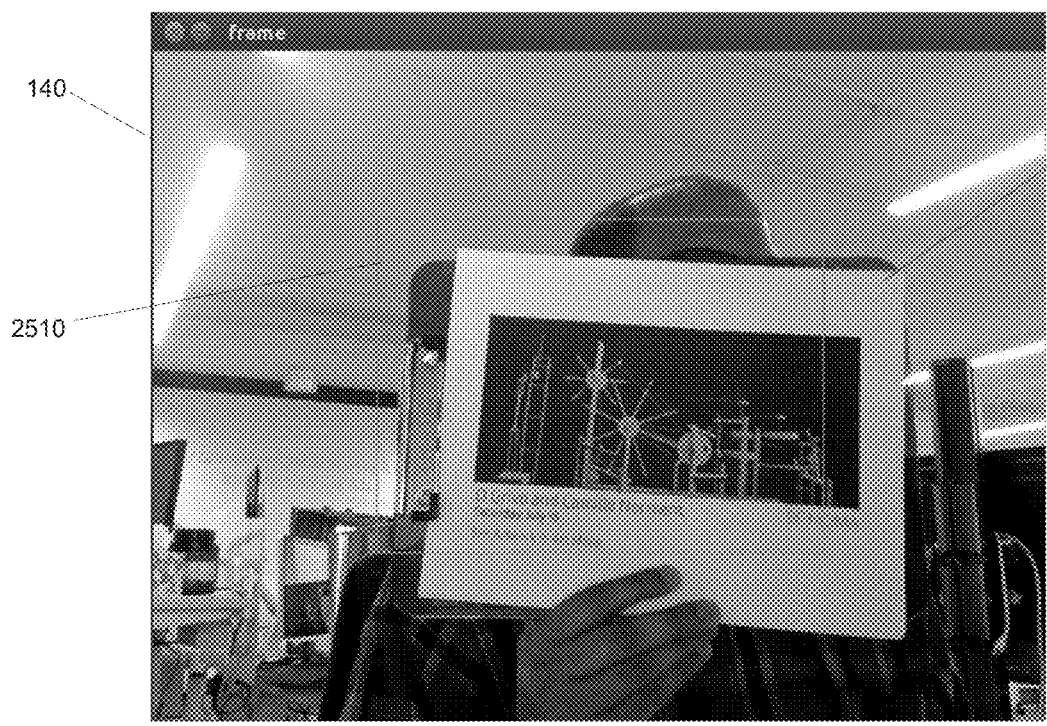
FIG. 25A
FIG. 25B

SYSTEM AND METHOD FOR CONTEXT-BASED INTERACTION FOR ELECTRONIC DEVICES

CROSS-REFERENCE TO RELATED APPLICATIONS

This application claims the priority benefit of U.S. Provisional Patent Application No. 62/509,600, filed on May 22, 2017, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments generally relate to content interaction and, in particular, to integrating contextual interaction with voice, gesture or devices.

BACKGROUND

Even though voice interaction with electronic devices has advanced in the past decade, there still lacks the ease and intelligence of human-to-human interaction. Further, such voice interfaces are often limited in scope and capabilities when compared to other modalities of interaction.

SUMMARY

One or more embodiments generally relate to integrating contextual interaction with voice, hand or pointing devices. In one embodiment, a method provides for receiving a voice input at an electronic device. An ambiguity of the voice input is determined. The ambiguity is resolved based on contextual data. The contextual data includes at least one of: an image, a non-voice input comprising a gesture, a pointer of a pointing device, a touch comprising a gesture, a pointer of a pointing device, a touch, or a combination thereof.

In another embodiment, an electronic device includes a memory storing instructions. At least one processor executes the instructions including a process configured to receive a voice input, determine an ambiguity of the voice input, and resolve the ambiguity based on contextual data. The contextual data includes at least one of: an image, a non-voice input comprising a gesture, a pointer of a pointing device, a touch, or a combination thereof.

In one embodiment a non-transitory processor-readable medium that includes a program that when executed by a processor performing a method that includes receiving a voice input at an electronic device. An ambiguity of the voice input is determined. The ambiguity is resolved based on contextual data. The contextual data includes at least one of: an image, a non-voice input comprising a gesture, a pointer of a pointing device, a touch, or a combination thereof.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIGS. 24A-B shows another example of voice plus computer vision, according to some embodiments;

FIGS. 25A-B shows yet another example of voice plus computer vision, according to some embodiments;

DETAILED DESCRIPTION

Figure 1:
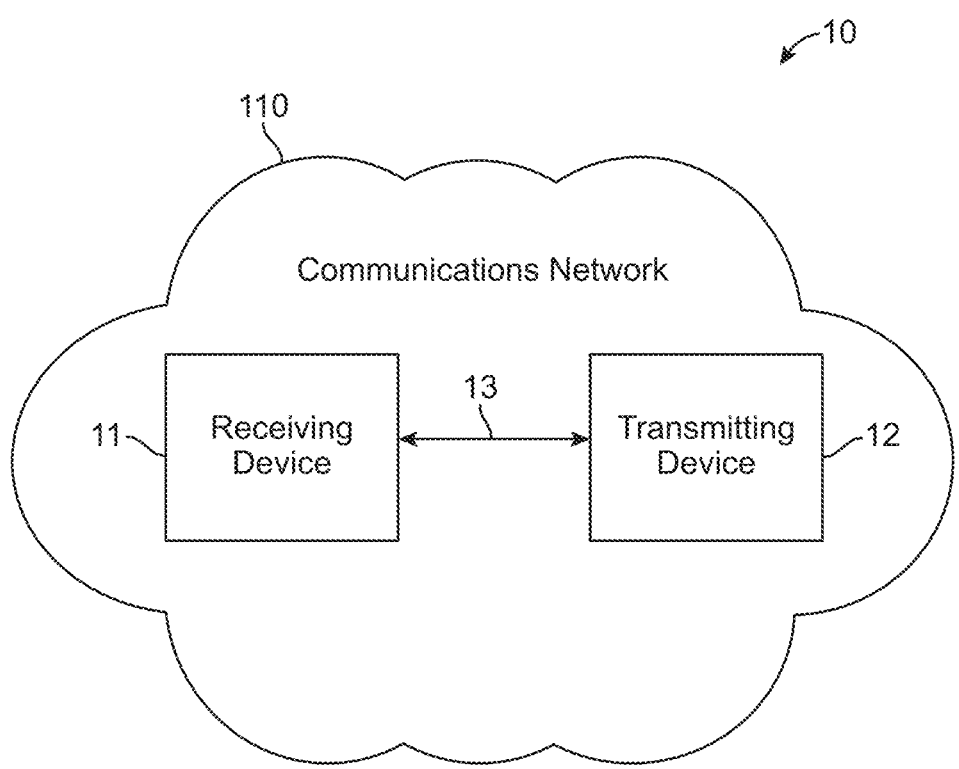
FIG. 1 shows a schematic view of a communications system, according to some embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments provide for improving, for example, an intelligent assistant's response to voice input based on contextual information provided by other mechanisms/modalities. Multiple advantages may be achieved by the context based interaction that include, but are not limited to the following: controlling a piece of content (e.g., a music file, video file, etc.) amidst a myriad of options (e.g., play, forward, pause, etc.), conditional individual selection, shortening navigation, disambiguation of voice command options, consolidation of actions to an item, transferring properties between items without knowing their details, disambiguating in large collections of content, allows on-screen user interface (UI) to interact with off screen UI/processes, replacing multiple onscreen UIs, perform spatial tasks more efficiently, disambiguation of service to be used to complete an action, dynamic refinement of UI based on real-time voice and hover input, contextual query, conditional mass selection/interaction, allows a more conversational interface using demonstratives (terms like 'this' or 'that'), use demonstratives to add contextual intelligence to various activities such as selection, exclusion, assignment, query etc., uninterrupted, real-time modification of interaction properties, disambiguation between multiple voice enabled devices—allows spatially targeting input to a particular device, etc., which are further described below.

The examples described below show how various data including different inputs may be correlated together to improve user interactions and controls, according to some embodiments. While some examples show how gesture inputs or controlling device inputs may be used to provide contextual information to facilitate voice inputs, in some embodiments voice inputs may be used to provide contextual information to support gesture inputs or controlling device inputs.

Spatial context is a crucial component of most human to human interaction. For example, when a parent says "pick this up and put it over there," words such as 'this' and 'there' (i.e., demonstratives), serve as critical links in the child's understanding of the parent's intention and the objects to which they are targeted to. Voice interfaces of electronic devices can understand the action in the command (e.g., pick, put, etc.) based on natural language processing and understanding, but will have difficulty understanding the full intent of the command without spatial context.

Users are able to speak about what they know. It is common, however, that users are not aware of the full description of an item or object that they would like to interact with or obtain information about. Voice interfaces can use speech synthesis to list the user's options, but they often end up being lengthy, cumbersome experiences rife with recall issues for the users. In other times, it may be difficult in distinguishing similar sounds and/or pronunciation.

In a multi-modal world, context from one modality would impact interaction on another. Current voice interfaces hardly use such cross modal inputs for richer context. When there are multiple pieces of content that may all activate with the same "key word," it may cause disruptive overlap because there is no spatial disambiguation for voice commands. The same could be said about multiple devices activated via the same keyword.

It is also cumbersome and unnatural to perform spatial tasks with a voice only interface. This is especially true in a multi-device scenario, when the user is in front of a cluster of voice enabled devices, but wants to speak or emit commands to a specific device. Users are forced to perform associations with the desired device for example, using the device names, and are forced to remember such details. Additionally, this also lengthens interactions by adding one more step of device selection via voice before any interaction could happen.

In situations such as shopping using voice agents, users have to provide detailed information such as the complete name of the product, the flavor, the size etc., which becomes a lengthy interaction. Various embodiments have addressed the challenges identified above.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols may include, for example, GSM, GSM plus EDGE, CDMA, quadband, and other cellular protocols. In another example, a long-range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include, but are not limited to mobile telephone devices, television systems, cameras, camcorders, a device with audio video capabilities, tablets, wearable devices, smart appliances, smart picture frames, and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
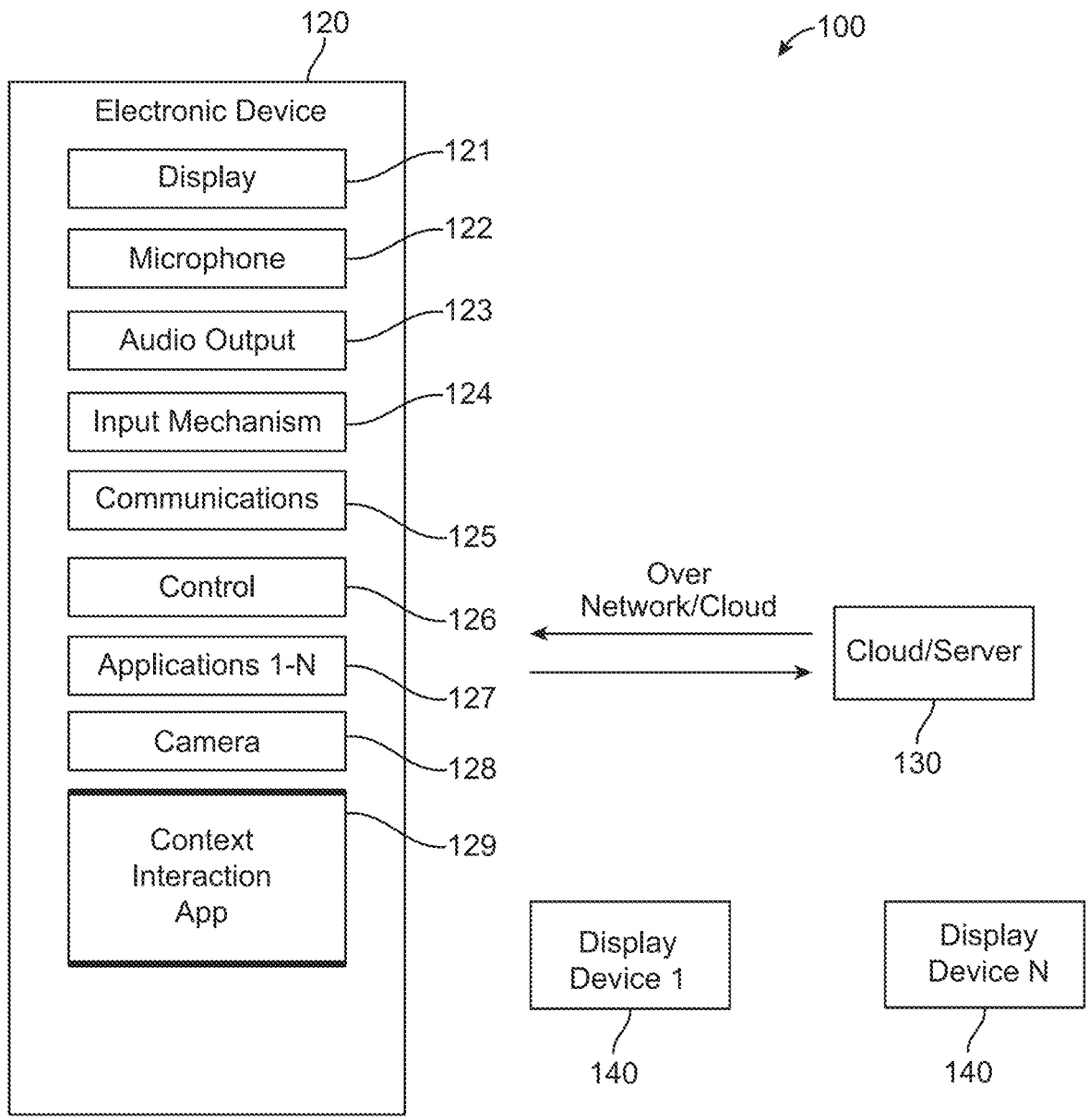
FIG. 2 shows a block diagram of architecture for a system including an electronic device including a context interaction app, according to some embodiments.

FIG. 2 shows a functional block diagram of an architecture system 100 that may be used for contextual interaction with voice, hand or pointing devices, and for interacting with display devices 1-N 140 (e.g., tablets, monitors, digital photo display frames, computing displays, television displays, projected displays, etc.; where N is ≥0) using an electronic device 120 (e.g., mobile telephone devices, television (TV) systems, cameras, camcorders, a device with audio video capabilities, tablets, pad devices, wearable devices, smart appliances, smart picture frames, smart lighting, etc.). Both the transmitting device 12 (FIG. 1) and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera 128, a context interaction app 129 (for contextual interaction with voice, gesture or devices, and for interacting with display devices 1-N 140), and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD screen, LED screen, OLED screen, etc.) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, mouse, visual pointer, remote control, one or more sensors (e.g., a camera or visual sensor, a light sensor, a proximity sensor, a capacitive hover sensor, etc., or a touch screen). The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include applications 1-N 127 including, but not limited to: an automatic speech recognition (ASR) application, OCR application, a dialog application, a map application, a media application (e.g., QuickTime, MobileMusic.app, or MobileVideo.app), social networking applications (e.g., FACEBOOK®, INSTAGRAM®, TWITTER®, etc.), a calendaring application (e.g., a calendar for managing events, appointments, etc.), an Internet browsing application, etc. In some embodiments, the electronics device 120 may include one or multiple applications operative to perform communications operations. For example, the electronics device 120 may include a messaging application, an e-mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the context interaction app 129 comprises processes and/or programs for integrating contextual interaction with voice, gesture or devices for playing, manipulating, selecting, using, exploring, etc. content elements. The content elements may include: visual content, graphic images, video content, photos, music content, etc. The context interaction app 129 may include any of the processing for, but not limited to, the examples as described below.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

In some embodiments, the following classifications may be used for the examples described below:
 1. Within device disambiguation:
  1. Voice+Hover
  2. Voice+Cursor
  3. Voice+Point
  4. Voice+Touch
  5. Voice+Show
  6. Miscellaneous combinations;
 2. Among device disambiguation.
Additionally, other classifications may be implemented, such as voice+gaze, etc.

Figure 3:
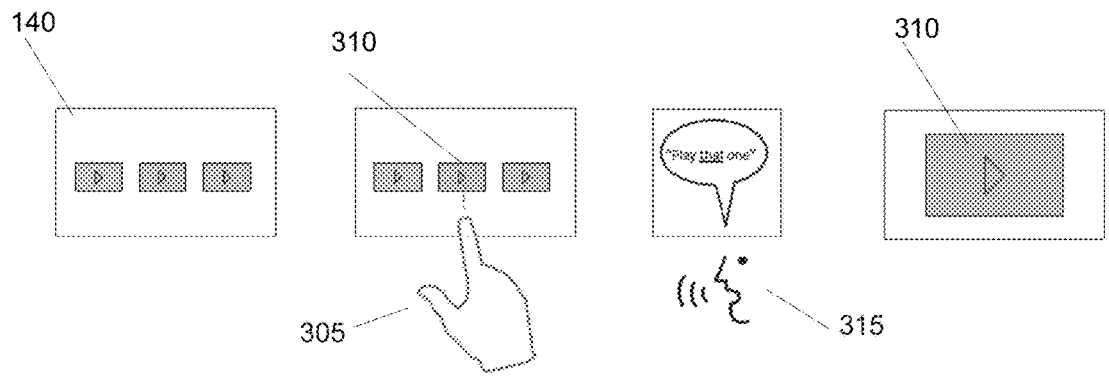
FIG. 3 shows an example of managing a content element amidst a myriad of options, according to some embodiments.

FIG. 3 shows an example of controlling a content element amidst a myriad of options, according to some embodiments. In one example, when multiple video episodes from a season of a television (TV) show are selectable for content playback, instead of saying the name of the show, the season and the specific episode number, in some embodiments the user can simply point to the content (with their hand/finger) that they are interested in playing and saying only "Play that one." The context interaction processing (e.g., using system 100 (FIG. 2), device 120, context interaction app 129 or any combination thereof) correlates the gesture input with the voice input to determine the correct content to be selected and the action to be taken on the content. In the example of FIG. 3, a display 140 is shown with three content elements (e.g., videos, music files, etc.). The user points with a finger for gesture 305 at the content element 310 and speaks an utterance 315 "play that one." The microphone (e.g., microphone 122) receives the utterance and a speech processing application determines the ambiguity of the terms "that one." Without further interaction, a typical system would have to query further as to which content element the user wants the "play" command to apply. In some embodiments, however, the context interaction processing uses the additional context of the gesture 305 as captured by an input mechanism 124 in combination with the spoken ambiguity (utterance 315) to select content element 310 and play (action) the selected content element 310 on an electronic device 120. In some embodiments, upon detection of a gesture 305, the context interaction processing determines that the gesture 305 is pointing toward the content element 310, and uses the determination as a selection, along with the action term "play" (determined by the utterance 315), and selects an app (e.g., an app from applications 1-N 127) to perform the action (e.g., a content player). Any media device contains several different types of content such as images, music, videos, etc. Depending on the content type, only a certain set of actions makes sense for that particular content type. For example, "play"-ing the content makes sense for music and video, but not for a photo or a document. Therefore, in some embodiments each content is mapped with a narrow set of commands that are relevant to that content type. Similarly, each application can only play certain content types. When the user utters the word "play" while gesturing at a content, the context interaction app 129

(or context interaction processing 3430) checks to see if this command matches with the set of commands supported by this content type. If it does, processing proceeds to accomplish that command using an application that supports the selected content type. In some environments, it could be desirable to know that the gesture and voice command were issued by the same person. It may be observed here that the person issuing the gesture has to be close to the input mechanism (on the device or in range of the pointer) while using the electronic device 120, and it would be unnecessary to process any voice input coming from afar. The distance range of a microphone (e.g., microphone 122) may be dynamically modified by altering its signal to noise ratio. As a result, a far-field microphone can be instantly switched to near-field mode, only picking up sounds within a smaller region. In some embodiments, when the electronic device 120 senses engagement by the user via a gesture input, it automatically switches to near-field mode, reducing the voice input range to a much smaller region and hence only picking up voice commands by the user who is in close proximity to the electronic device 120. This can allow the electronic device 120 to be used in moderately noisy or loud environments ranging from group home movie watching experiences to public spaces such as airports.

In one or more embodiments, a combination of face recognition, face identification, lip movement recognition, and posture recognition techniques may be used to identify if the voice commands being received are also from the user who is performing the gesture. In scenarios where two users are sitting side-by-side with each other while only one of them is interacting with the electronic device 120, these techniques can allow to associate voice input to the user who is performing the gesture and selectively process them, while ignoring the other user who might also be speaking but not necessarily directing commands to the device.

In some embodiments, the category of within device disambiguation refers to a class of techniques in which context is used to enhance voice input to improve interactions within a single display 140. There are several scenarios within the state of a single display 140, where voice input alone is inadequate/insufficient to control the display's 140 state. In some embodiments, context may be achieved using additional modalities, resulting in an improved user experience. For Voice+Hover, voice input may be of particular interest to users when they interact with computing devices 120 that they cannot or prefer not to touch directly. For example, when the user tries to follow digital recipes in the kitchen, or practice certain sports following digital instructions.

Figure 4:
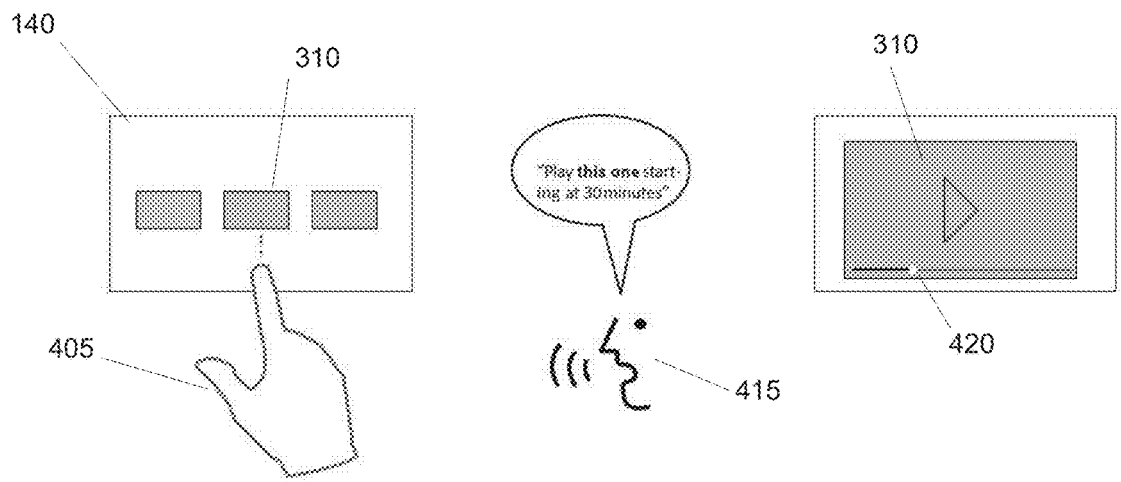
FIG. 4 shows an example of a conditional individual selection, according to some embodiments.

FIG. 4 shows an example of a conditional individual selection, according to some embodiments. In some embodiments, conditional selection is accomplished when considering both voice input and hover input (e.g., a gesture). In this example, when a user's finger hovers (gesture 405) over a specific object (content element 310) displayed at a display 140 surface of an electronic device 120, not only can they just provide simple action commands such as 'play' to activate that object, but they can also provide compound conditional statements as instructions to activate the object. The computing device processes these conditional commands even before opening/activating/launching the chosen content, to display them in a manner desired by the user. As shown, the user provides an utterance 415 of "play this one starting at 30 minutes." The context interaction processing determines the action term "play" and the condition "starting at 30 minutes" to apply to the content element 310. The context interaction processing uses an input mechanism (e.g., input mechanism 124, FIG. 2) to identify what the gesture 405 is pointing at on the display 140) along with the action and condition to launch the content element 310 at the point 420 of the length of play for the content element 310 using a voice recognition process or application.

Figure 5:
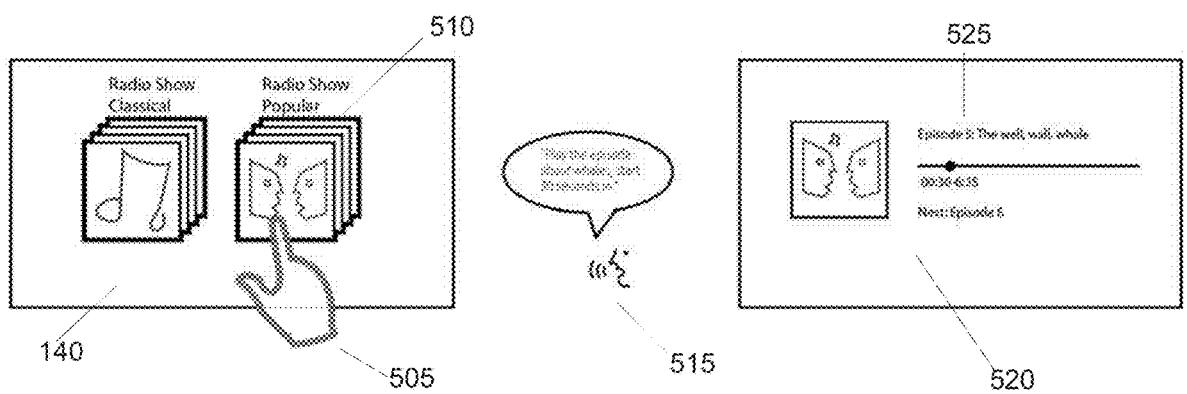
FIG. 5 shows an example of shortening navigation, according to some embodiments.

FIG. 5 shows an example of shortening navigation, according to some embodiments. In a multi-hierarchical menu 510, a user would step through multiple levels of menus to get down to the desired piece of content, which adds considerable number of steps and delay the selection process. Instead, users can use the processing described above to shorten navigation. As shown, the user can hover over the parent multi-hierarchical menu 510 that they are interested in and express the particular child/grandchild/great grandchild, etc., menu item that is associated with the content element 525 that they are interested in, and jump to selecting the specific content element 525 directly by providing an utterance 515 of "play the episode about whales, start at 30 seconds in." The voice recognition process or application determines whether the specified content element 525 is in the multi-hierarchical menu 510 based on the gesture 505 pointing to the multi-hierarchical menu 510 (of the two available menus on the display 140) and a search within the multi-hierarchical menu 510 based on the terms "about whales." Once the content element 525 is found, the context interaction processing starts the appropriate app/application for playing the content element 525 at the point 520, which is 30 seconds from the start of the video.

Figure 6:
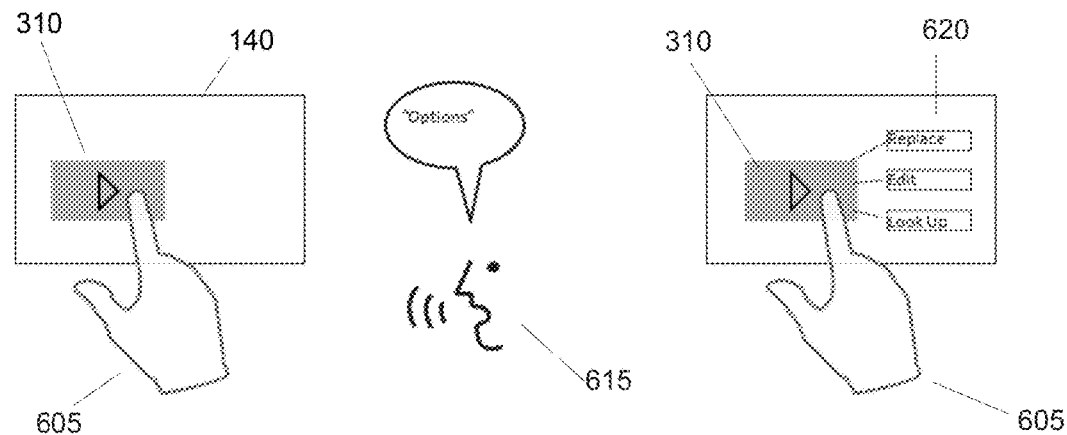
FIG. 6 shows an example of disambiguation of voice command options, according to some embodiments.

FIG. 6 shows an example of disambiguation of voice command options, according to some embodiments. This example shows how voice helps a user understand what she can do with a particular content element 310 shown on a display 140. When the gesture 605 for a user's finger hovers over a specific object (content element 310) displayed at a display 140 surface of an electronic device (e.g., an electronic device 120), there may be many actions available. By saying, for example, "options," the electronic device is able to use both the hover input (gesture 605) and the voice input (utterance 615) to determine that the user desires to see (or hear) options for only the object her finger(s) hovers over. Without the hover input, the electronic device may not be able to understand the voice command, or might end up providing options available for the whole display 140 system instead of for the specific content (content element 310) desired. Without the voice input (utterance 615), gestures more than hovering may be required for the electronic device to decide what the user's intention is. When the options 620 pertaining to the content element 310 are displayed, the user may speak out the name of one of these options 620 to select them—for example, the user would stay on the play icon with gesture 605 and speak out "look up" to select that particular option. This reduces travel/movement of hands required for a set of operations. Alternatively, the user can choose to move their hands to hover over the 'look up' object and say "select" to invoke that option.

Figure 7:
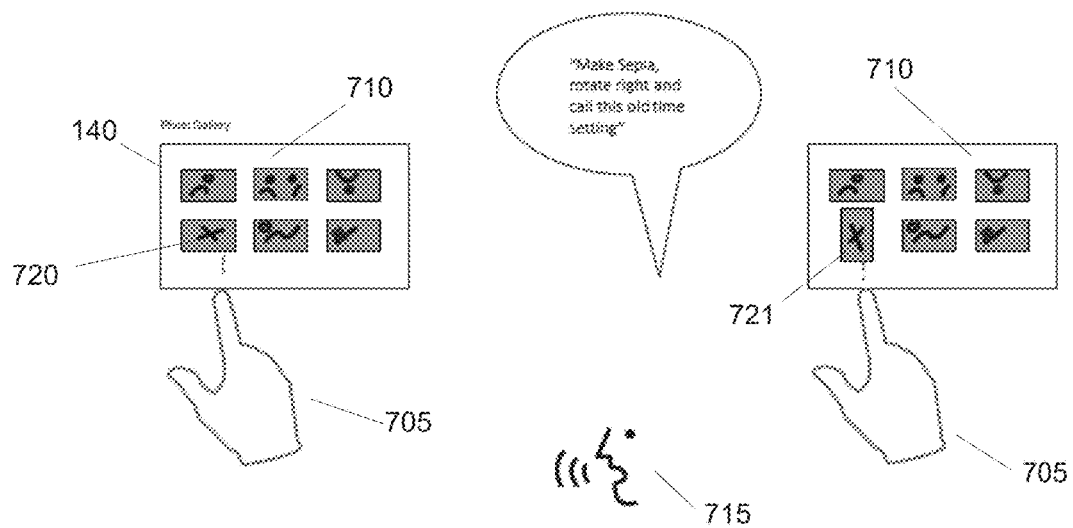
FIG. 7 shows an example of consolidation of actions to an item, according to some embodiments.

FIG. 7 shows an example of consolidation of actions to an item, according to some embodiments. As shown, hover inputs using gesture 705 assists in mass editing of content elements 710 (shown on display 140) using a voice utterance 715. With the hover input of gesture 705, an electronic device (e.g., electronic device 120, FIG. 2) is able to identify one specific object (content element 720) of multiple content elements 710 (e.g., a photo gallery) and apply one or more edits to it. The example utterance 715 includes the terms "make sepia rotate right and call this oldtime setting." The voice recognition process or application determines the action words meanings (of "make sepia," "rotate right," and "call") and uses the gesture 705 (using input mechanism, e.g., input mechanism 124, FIG. 2) to determine the user's intent of selecting content element 720. The computing device is further able to save these editing steps as one template "oldtime setting." The result of using the context interaction processing is that the content element 720 becomes content element 721 with the changes made (i.e., color is now sepia, and the content element is rotated to the right 90 degrees (e.g., default rotation).

Figure 8:
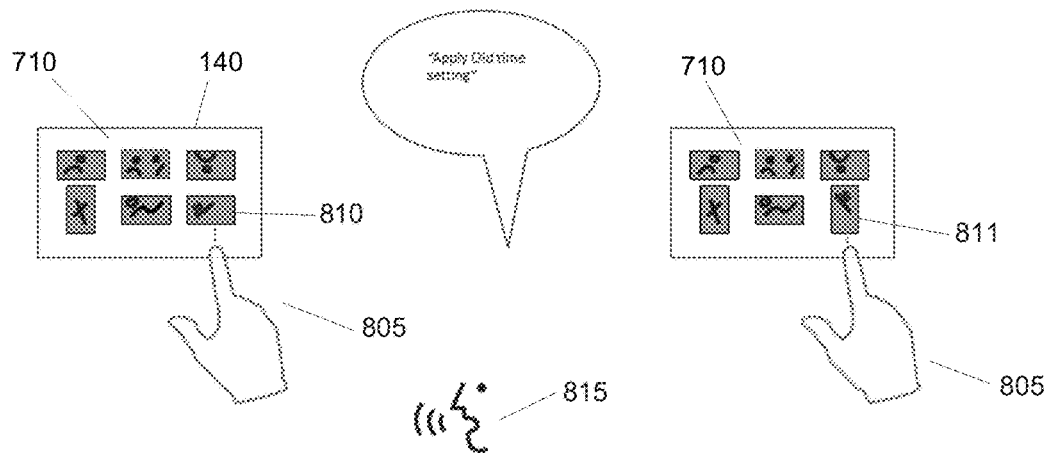
FIG. 8 shows another example of consolidation of actions to an item, according to some embodiments.

FIG. 8 shows another example of consolidation of actions to an item, according to some embodiments. With the hover input changes from the example in FIG. 7, the electronic device is able to understand that another object (content element 810) is the focus for the next voice command (utterance 815) based on the hover input (gesture 805), and applies the saved template of "oldtime setting" to the content element 810 to arrive at the modified content element 811 that now has the color sepia, and is rotated to the right.

Figure 9A:
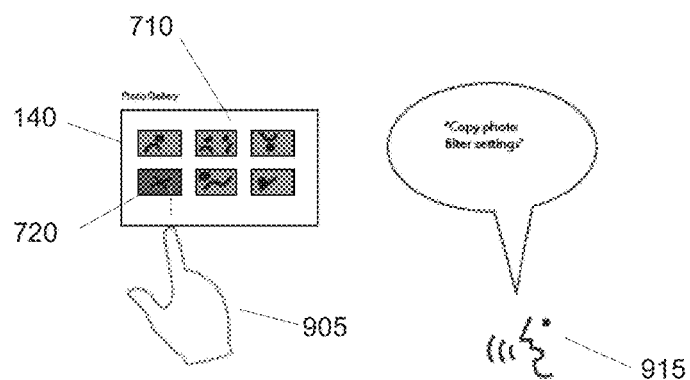
FIGS. 9A-B show an example of transferring properties between items without knowing their details, according to some embodiments.
Figure 9B:
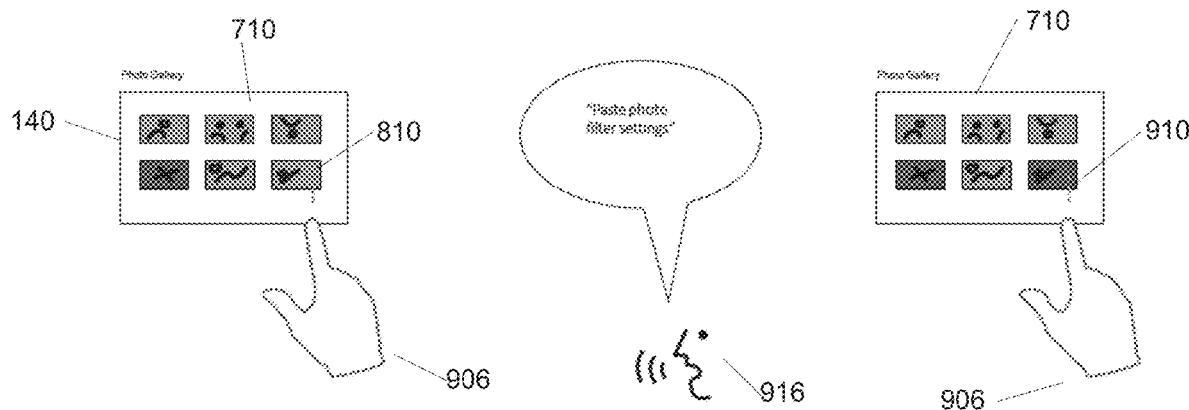

FIGS. 9A-B show an example of transferring properties between items (e.g., content elements) without knowing their details, according to some embodiments. As shown, the voice input utterance 915 identifies a command ("copy photo filter settings") and the hover input gesture 905 helps narrow down to which object the command should be applied. The display 140 includes multiple content elements 710, and the gesture 905 is pointing towards content element 720. In FIG. 9B, the context interaction processing applies the voice utterance 916 of "paste photo filter settings" to the content element 810 selected by the hover gesture 906. In these operations, the user is able to perform a copy of properties from content element 720 (FIG. 9A) to content element 810 without having to know the details involved in the setting. In some embodiments, the context interaction processing uses the voice recognition processing or application to determine the term "settings" for the content element 720 (e.g., applied photo settings), for example from a photo gallery application. The context interaction processing then applies each of the settings to the content element 810 arriving at the modified content element 910.

Figure 10A:
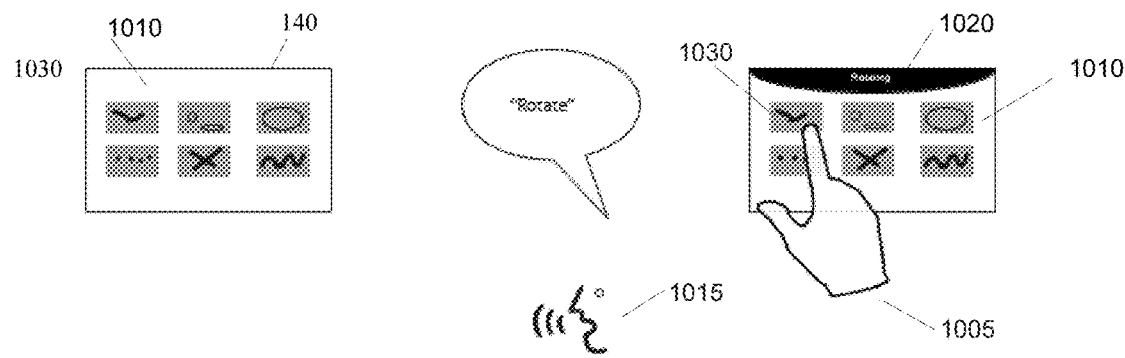
FIGS. 10A-B show an example of actions applied to multiple pieces of content, according to some embodiments.
Figure 10B:
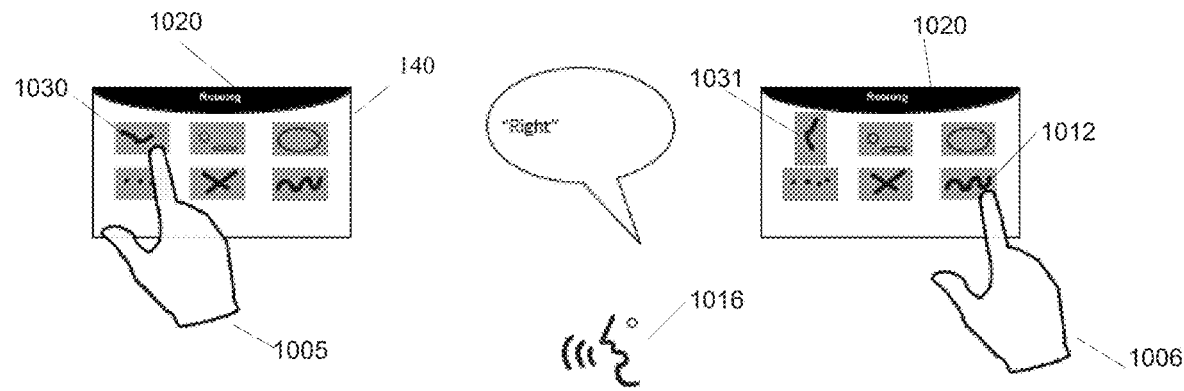

FIGS. 10A-B show an example of actions applied to multiple pieces of content 1010, according to some embodiments. In FIG. 10A, upon receipt of the first voice input of utterance 1015 ("rotate"), the electronic device (e.g., electronic device 120, FIG. 2) using the context interaction processing enters into a "Rotating" mode 1020. Next, the hover input gesture 1005 assists the electronic device to determine a first object (content element 1030) for application of the subsequent voice command utterance 1016 "Right," which causes the first object to rotate to the right, shown as object 1031.

Figure 11:
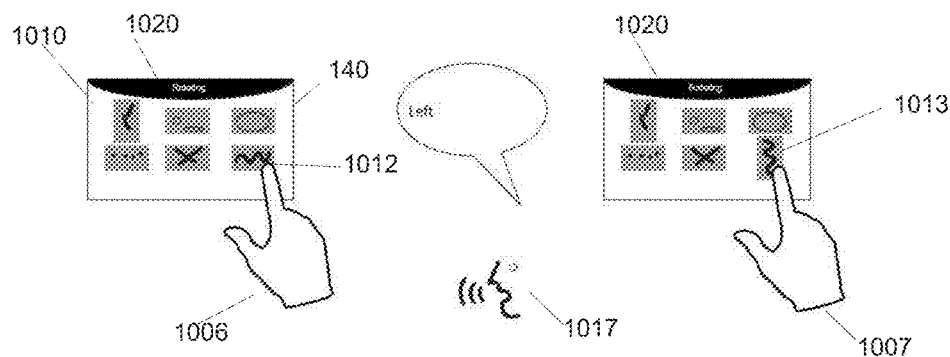
FIG. 11 shows another example of actions applied to multiple pieces of content, according to some embodiments.

FIG. 11 shows another example of actions applied to multiple pieces of content, according to some embodiments. In FIG. 10B, another gesture 1006 hovers over a second object (content element 1012). While hovering a finger over the second object with gesture 1006, the electronic device is able to apply the subsequent voice command utterance 1017 "Left" to the second object and causes the second object to rotate to the left while in the rotating mode resulting in the modified second object 1013. That is, once the rotating mode (or any other mode, such as sizing, filtering, locating, etc.), uttered commands are recognized and interpreted as actions and applied using the gestures based on the input mechanism (e.g., input mechanism 124, FIG. 2) and context interaction processing recognizing the hover location relative to the displayed object.

Figure 12A:
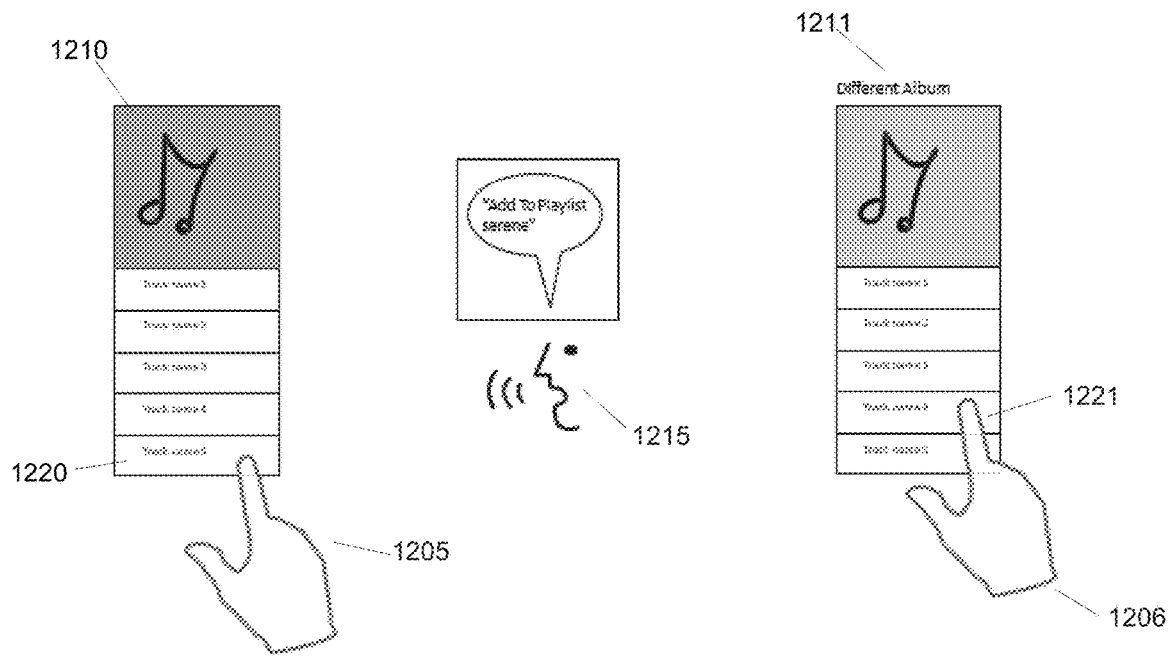
FIGS. 12A-B show an example of allowing on-screen user interface (UI) to interact with off screen UI/processes, according to some embodiments.
Figure 12B:
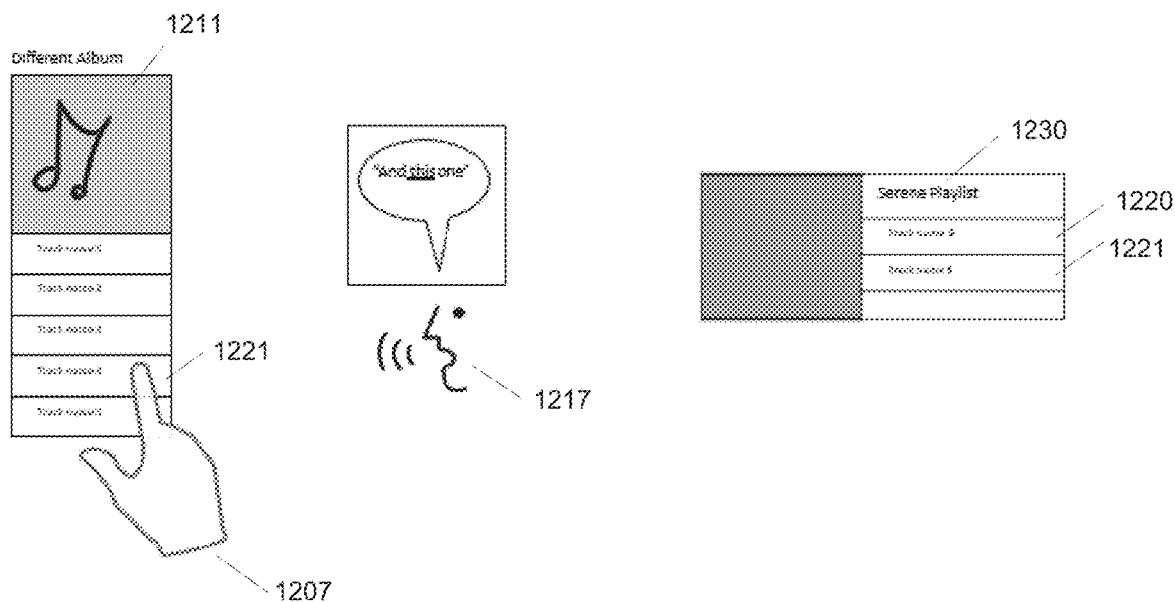

FIGS. 12A-B show an example of allowing an on-screen user interface (UI) to interact with off screen UI/processes, according to some embodiments. As shown, the context interaction processing provides that instead of having users navigate through multiple menus, hover input plus voice input allow continuous speech across an application. In FIG. 12A, the electronic device (e.g., an electronic device 120, FIG. 2) using the context interaction processing is able to add a track 1220 selected by the hover gesture 1205 from a first Album 1210 (first UI) to playlist "serene" 1230 using utterance 1215 of "add to playlist serene" and gesture 1206. In FIG. 12B, the user does not need to repeat the command but can simplify the voice command (utterance 1217, "and this one") to add another track 1221 selected by the hover gesture 1207 from a second Album 1211 to the same (serene playlist 1230) playlist.

Figure 13A:
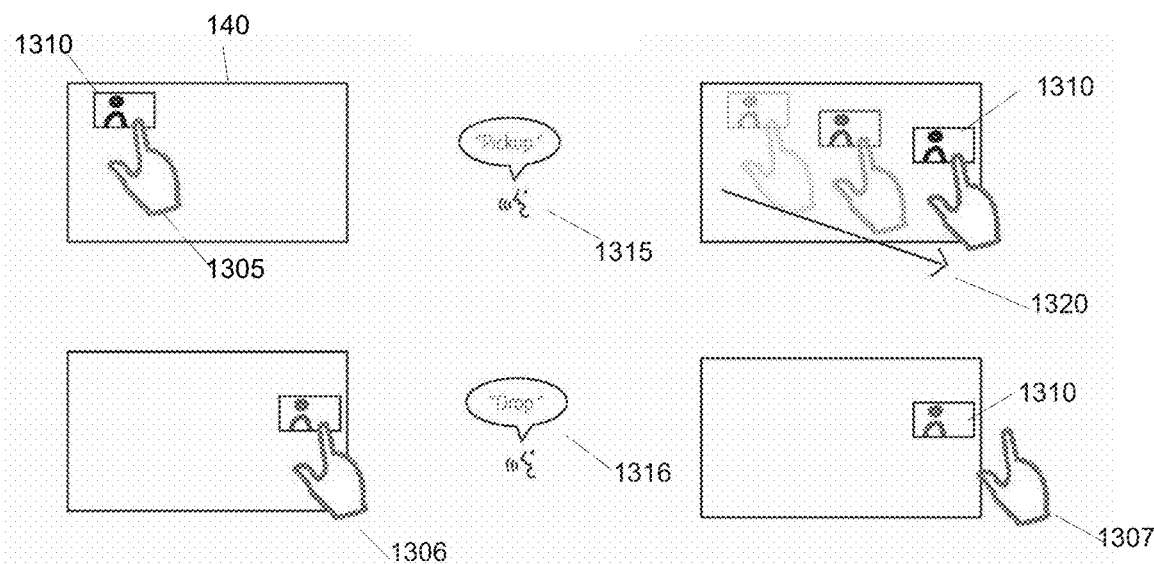
FIGS. 13A-C show examples of performing spatial tasks efficiently, according to some embodiments.
Figure 13B:
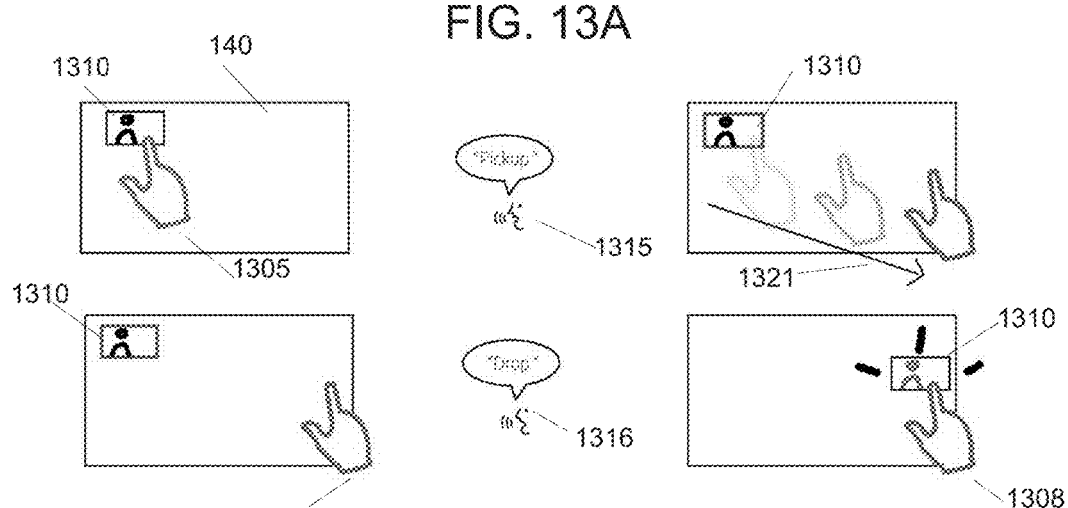
Figure 13C:
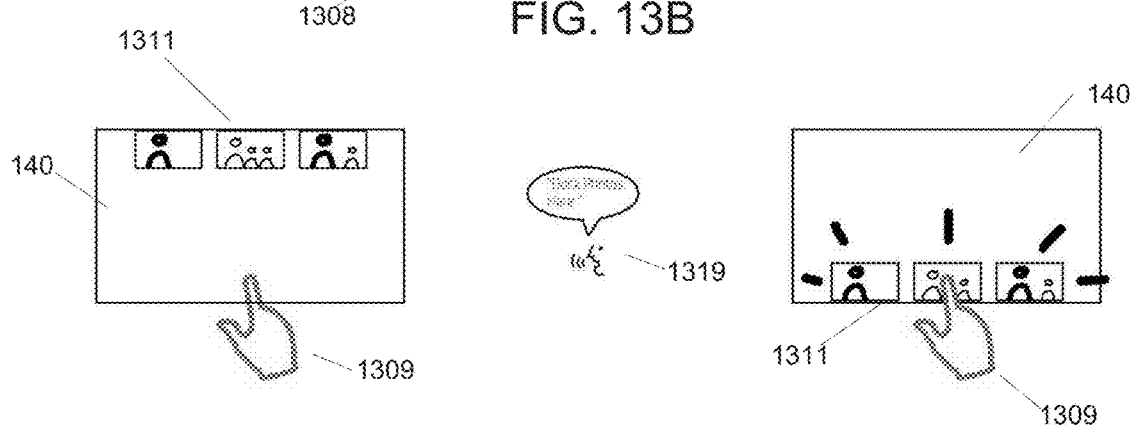

FIGS. 13A-C show examples of performing spatial tasks efficiently, according to some embodiments. In some embodiments, voice input along with the context provided by spatial input modalities, such as hover input, allow for performing spatial tasks more elegantly and efficiently. FIG. 13A shows the hover gesture 1305 along with voice utterance 1315 of "pickup" applied to a content element 1310 (e.g., a photograph) displayed on display 140. The context interaction processing provides for commands, such as Pick up, drag, Drop, drop here, etc. for providing the action of picking up, dragging and dropping/placing the content element 1310. That is, the context interaction processing provides for the determined intent of selecting, dragging and dropping of the content element 1310. As user moves their finger in the direction of arrow 1320 and stops at gesture 1306, the content element 1310 is linked to its position using the input mechanism (e.g., input mechanism, 124, FIG. 2) and the context interaction processing. When the user provides the utterance 1316 "Drop" (or "drop it here," etc.) and moves their hand away as gesture 1307 indicates, the content element 1310 is now anchored to that new position.

In FIG. 13B, the commands, such as Pick Up, Then Drop (no Drag) voice utterances (utterance 1315 "pickup" and utterance 1316 "drop") provides action for picking up and dropping photo on the display 140. The content element 1310 gains, for example, a highlight, but remains in place. The user moves their finger around hover to gesture 1308 (e.g., in the direction of arrow 1321) and once they find suitable location speaks the utterance 1316 "drop." The content element 1310 then "teleports" to the new location.

In FIG. 13C, the context interaction processing provides for directional commands. As shown, the user points to an available space with gesture 1309 and uses voice utterance 1319 of "Dock photos here," which the electronic device 120 (FIG. 2) using the context interaction processing moves the content elements 1311 (e.g., a group of photos, etc.) to a new location.

Figure 14:
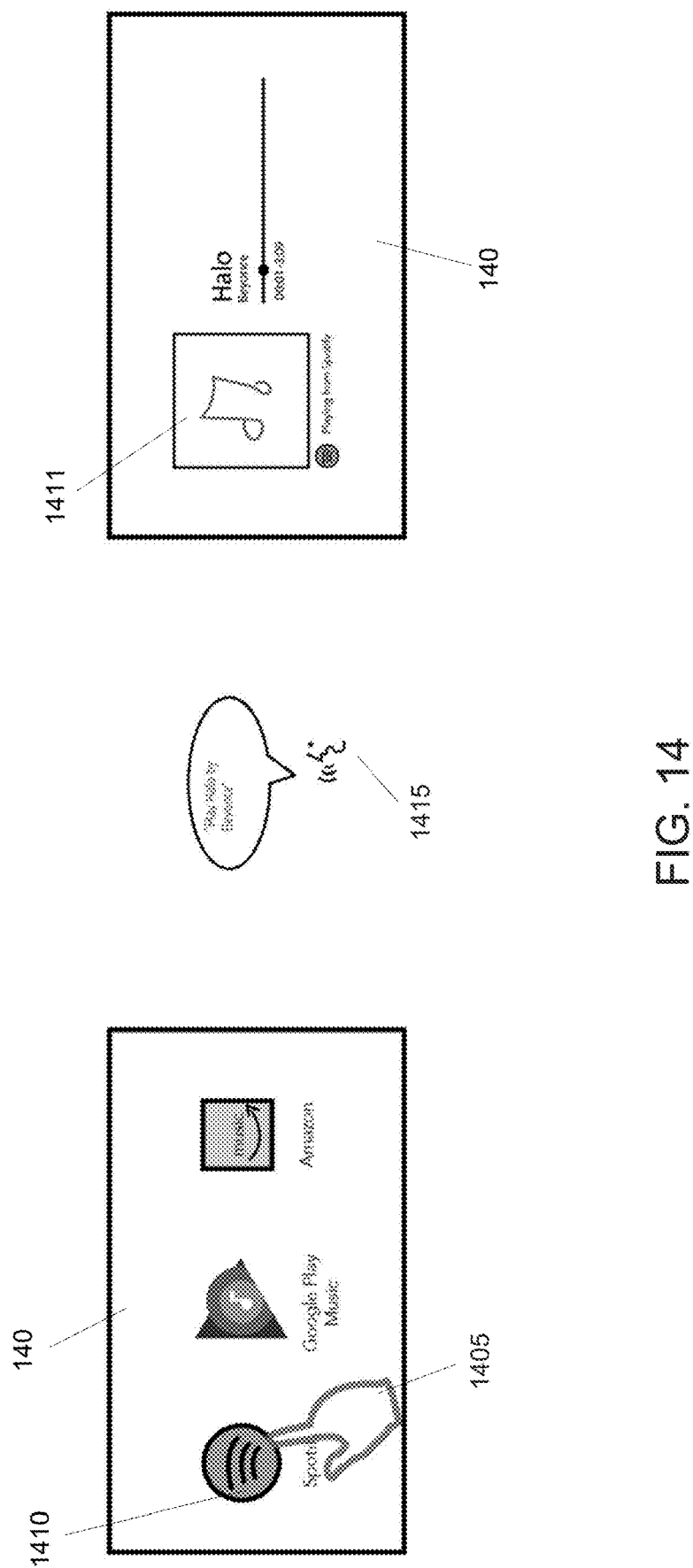
FIG. 14 shows an example of disambiguation of service used to complete an action, according to some embodiments.
Figure 15A:
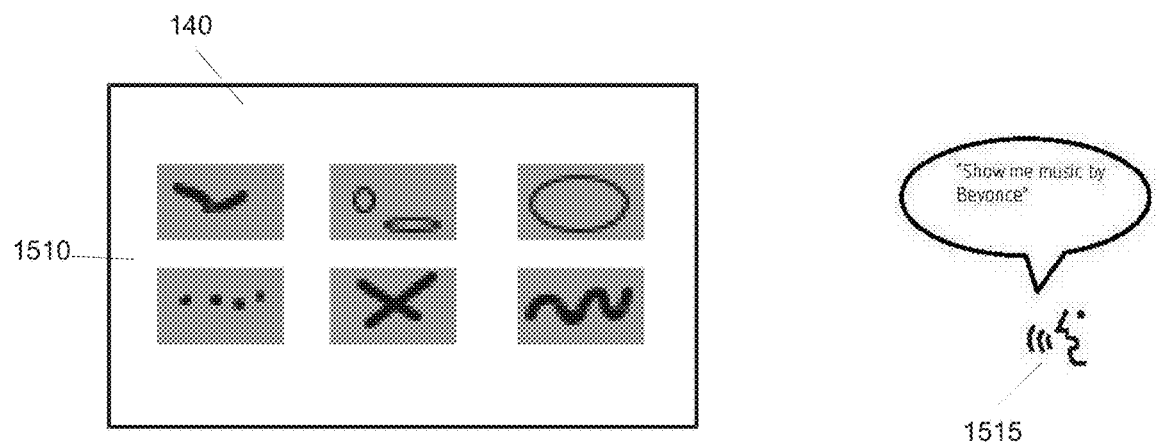
FIGS. 15A-D show examples of dynamic refinement of UI based on real-time voice input, according to some embodiments.
Figure 15B:
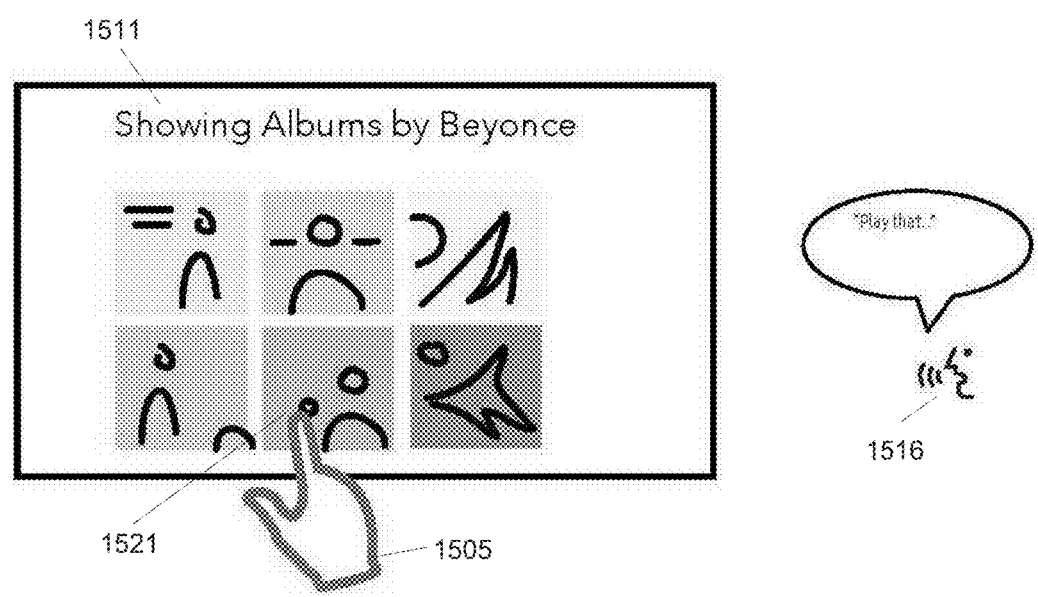
Figure 15C:
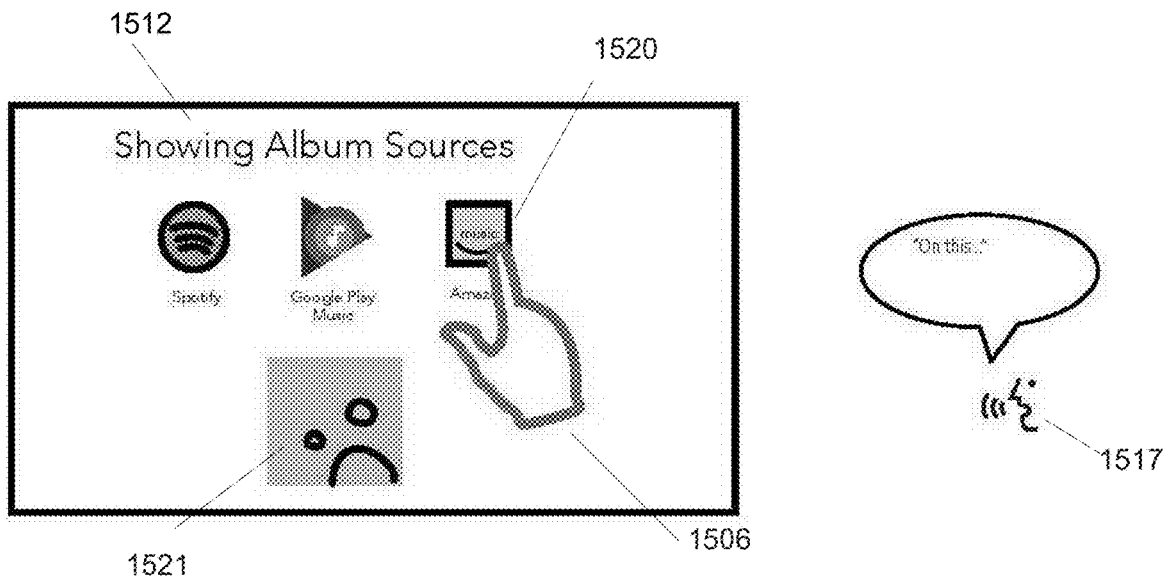
Figure 15D:
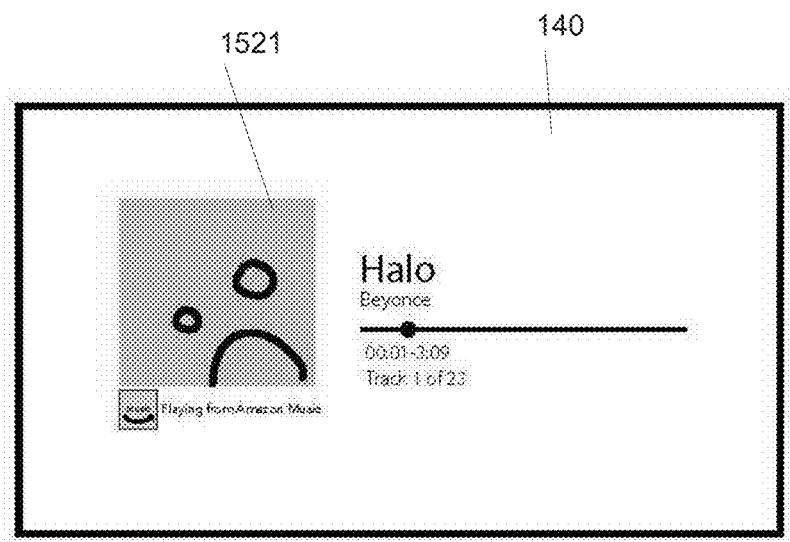

FIG. 14 shows an example of disambiguation of service used to complete an action, according to some embodiments. The example shows where a hover input (e.g., gesture 1405) serves as a mechanism to disambiguate the service 1410 (among multiple services) to be used while executing an action. In a voice only interface, if a user requests the electronic device 120 (FIG. 1) to complete a task, the electronic device will complete the action by picking one of the services that can achieve the action. To play a song by Beyoncé, if the user provides utterance 1415 "Play Halo by Beyoncé" the electronic device would pick the default application (e.g., Google Play) to play that track over other services such as SPOTIFY® or AMAZON® music. If the user prefers to play the track via a specific application, they have to explicitly mention the same in their voice command "Play Halo by Beyoncé using Spotify." In some embodiments, the user can instead hover over an icon for a compatible service (e.g., gesture 1405) and speak of an action (utterance 1415), which automatically gets channeled to the service hovered over. As shown the context interaction processing causes the electronic device 120 (FIG. 2) to play the track 1411 via the selected service 1410 instead of the default service or other service options.

FIGS. 15A-D show examples of dynamic refinement of a UI based on real-time voice input, according to some embodiments. Every interface/modality has its own strength and weakness. Some interfaces/modalities are better at certain tasks than others. Hover/touch/pointing interfaces are screen space input modalities. These modalities are great at selection and disambiguation from choices available within that screen, but their effectiveness is often limited to those visible choices. Typically, these modalities will need to go through multiple menu items to get to choices that are not provided in the current page/screen. Voice input, on the other hand is great for abstract starting points and are not limited by what could fit within a screen. Users can use a voice query to start interaction on elements that are not currently visible in a screen in a single step. On the other hand, they are not good for spatial disambiguation and spatial selection. In some embodiments, dynamic refinement plays on the strength of each interface for rapid and intuitive interaction. As users start to speak their commands, the visual interface using the input mechanism (e.g., input mechanism 124, FIG. 2) and context interaction processing filters and reconfigures itself to elements that fit within the context of the command executed. The more the user speaks, the more refined the interface becomes based on using, for example, machine learning models. Simultaneously, users also use their hands to hover and filter the interface even further to arrive at the final choices for selection.

In one example embodiment, when the user is browsing through content elements 1510 (e.g., photos), as they say the utterance 1515 "Show me music by Beyoncé," the electronic device (e.g., electronic device 120, FIG. 2) using the context interaction processing to identify cues such as music and Beyoncé to reconfigure the visual interface to only show music albums 1511 by Beyoncé. The user then hovers with gesture 1505 over an album 1521 and says the utterance 1516 "play that," which evokes another tray of services 1512 to execute the action "play" with. The user can either walk away for the electronic device to select the default service to complete this action, or the user can hover over a service of choice (music service 1520) with gesture 1506 and say the utterance 1517 "On this." Here, the voice input serves as a catalyst for continuous refinement of the interface for better hover interaction.

Figure 16A:
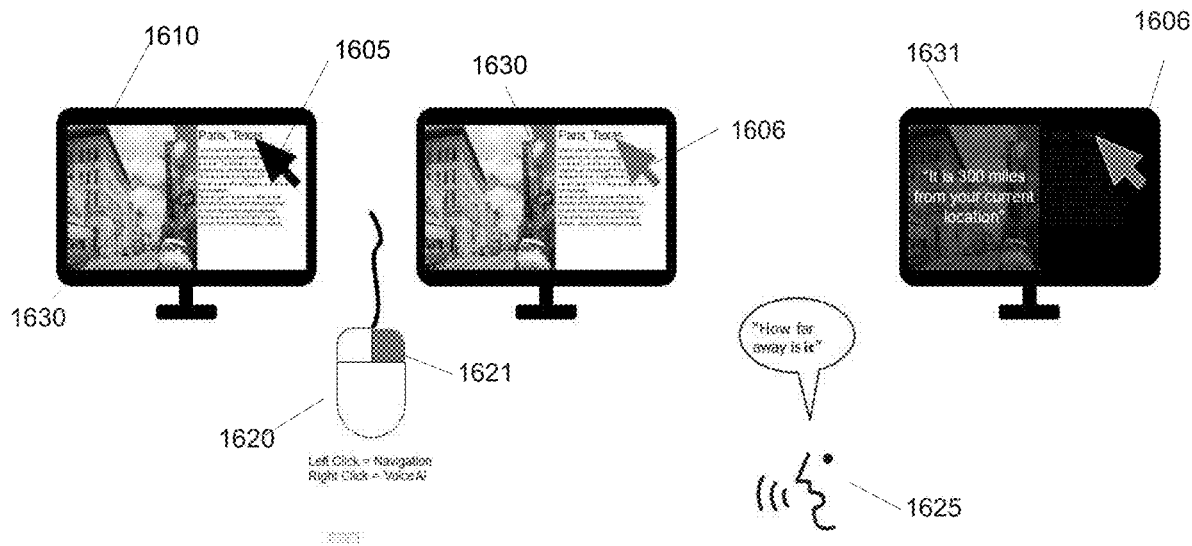
FIGS. 16A-B show examples of contextual queries, according to some embodiments.
Figure 16B:
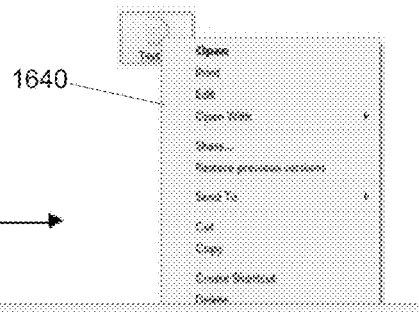

FIGS. 16A-B show examples of contextual queries, according to some embodiments. In some embodiments, the electronic device (e.g., electronic device 120, FIG. 2) uses the context interaction processing for Voice+Cursor combinations. As shown, the user may use a pointing device, e.g., a mouse 1620 having a left and right click available for interaction. In this example, the right click on a mouse is used as a dedicated input to bring up a voice/speech artificial intelligence (AI) process to assist with directed content.

In FIG. 16B, when the mouse is right clicked 1621, the conventional response is to provide a menu of actions 1640 that can be taken to the object pointed to by the cursor as a result of mouse movements. However, in some embodiments, there can be many actions for the user to choose.

In FIG. 16A, with voice command utterance 1625, the electronic device is able to take immediate action without further user inputs. In the example embodiment, on the display device 1610, the mouse cursor 1605 is pointing to the word "Texas" on a display of information 1630 regarding Paris, Tex. The user performs right clicking 1621 on the mouse 1620 and provides the utterance 1625 of "how far away is it," which may also modify the mouse cursor color, shape, intensity, etc. to mouse cursor 1606. In some embodiments, the context interaction processing may determine what is shown on the display 140 by knowing a search term that resulted in the display of the information 1630, using an optical character recognition (OCR) app, etc. The context interaction processing causes the electronic device to determine how far away Paris, Texas is to the user's current location using a map app, distance app, Internet app, etc., to determine distance using either the user's known location, using the electronic device's IP address, etc., the display 1610 then shows the result 1631.

Figure 17:
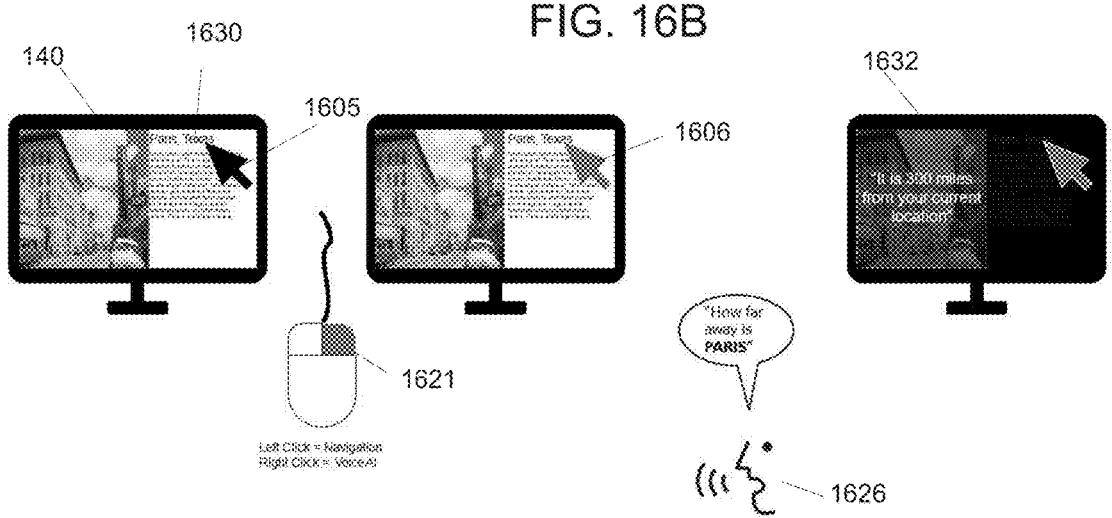
FIG. 17 shows another example of a contextual query, according to some embodiments.

FIG. 17 shows another example of a contextual query, according to some embodiments. In the example shown, the mouse cursor 1605 is used with voice to help resolve ambiguity, when one name ("Paris") may be mapped to various instances. The text 1630 pointed at by the mouse cursor 1605 helps the electronic device (e.g., electronic device 120, FIG. 2) using the context interaction processing understand that it is Paris in Texas of the U.S. that the user is interested in, instead of Paris, the capital city of France. That is, the context interaction processing can determine the displayed text and use that information to assist in determining the user's intent. In this example, a right click 1621 is made with the mouse cursor 1605 pointing to the information 1630. The mouse cursor changes to mouse cursor 1606 from the right click 1621, and the user issues the utterance 1626 of "How far away is PARIS." The context interaction processing then provides the information 1632. In some embodiments for situations when the cursor is not pointing to a specific area in the screen, when a user issues the utterance 1626 "How far away is PARIS," the electronic device 120 (FIG. 2) will still try to use the context of what is displayed on the screen to answer the query.

Figure 18:
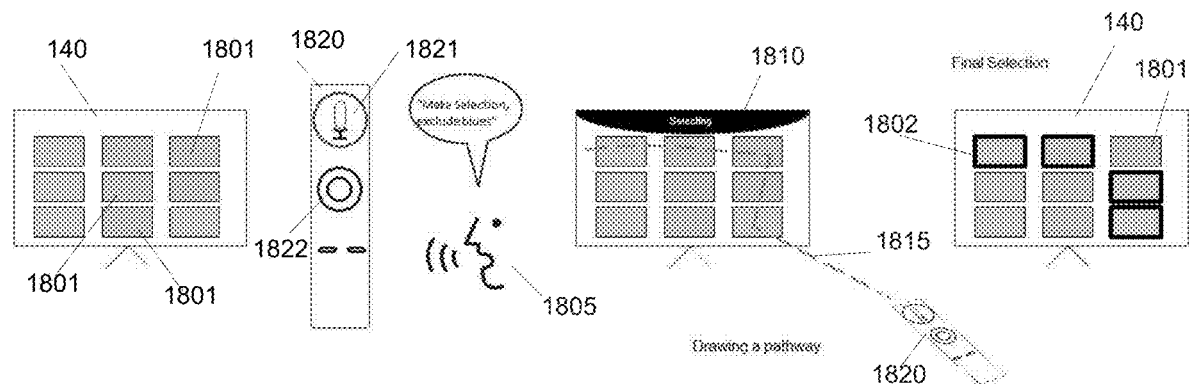
FIG. 18 shows an example of a conditional mass selection/interaction, according to some embodiments.

FIG. 18 shows an example of a conditional mass selection/interaction, according to some embodiments. In some embodiments, the conditional mass selection/interaction uses Voice+Pointer inputs. For this example, multiple objects (e.g., music tracks/files) are shown on display 140. In this example embodiment, the voice input utterance 1805 enables the electronic device 120 (FIG. 2) using the context interaction processing to enter into a "Selecting" mode 1810. The user is using a controlling device 1820 (e.g., a remote control) having a microphone selection 1821 and pointing element 1822 that invokes a pointer displayed on the display 140. The user may use the controlling device 1820 to point to one or more objects displayed. As a result, these objects that satisfy conditions laid out by the initial voice command become selected objects. In this example, the user provides the utterance 1805 of "Make selection, exclude blues." In the example, the blues elements 1801 are desired to be excluded. The user points at the display 140 invoking the pointing element 1822 and makes a selection moving the pointer as shown by the pathway (dashed line) 1815. The selected elements are shown as 1802 outlined boxes while the blues elements 1801 are not selected.

Figure 19A:
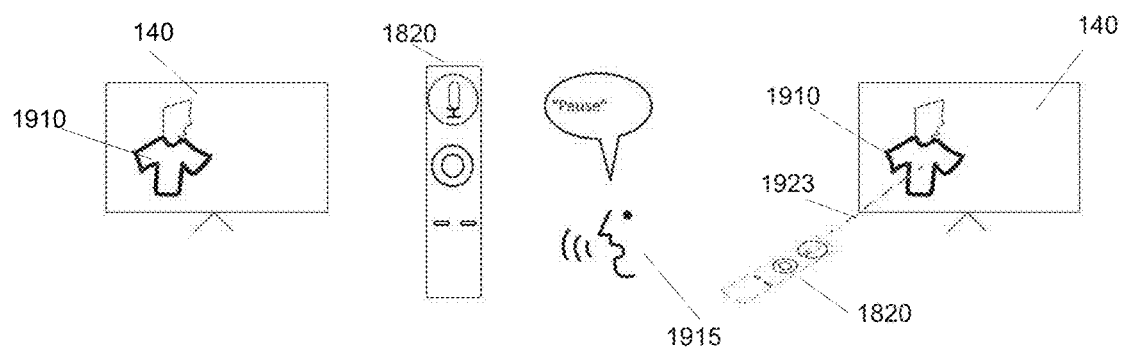
FIGS. 19A-B shows an example of providing a more conversational interface using demonstratives, according to some embodiments.
Figure 19B:
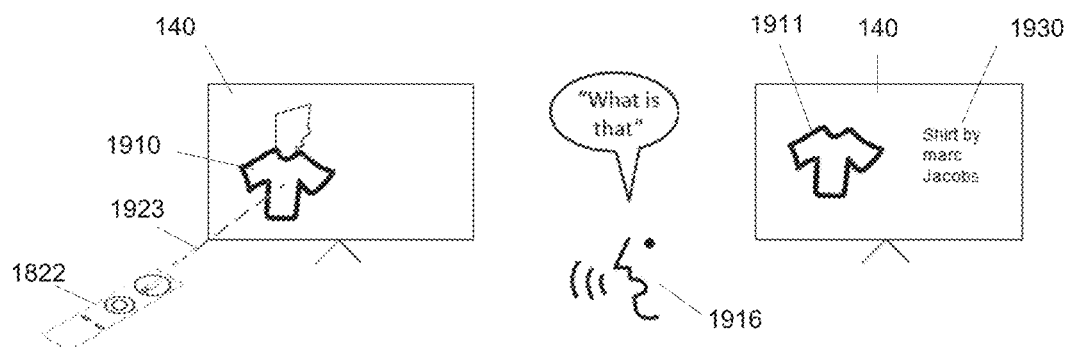

FIGS. 19A-B shows an example of providing a more conversational interface using demonstratives, according to some embodiments. In this example embodiment, the electronic device 120 (FIG. 2) using the context interaction processing uses a pointing element 1822 of the controlling device 1820 to identify a part of visual information, upon which a subsequent voice command can further act. As shown, an object shown on the display 140 may include a person wearing a shirt 1910 on a video. The user says an utterance 1915 "pause" using the microphone selection 1821 of the controlling device 1820 to pause the video. The user points 1923 at the shirt 1910 with the pointing element 1822 and issues the utterance 1916 of "What is that." The context interaction processing shows a display of the shirt 1911 with information 1930 about the shirt 1911. In one embodiment, the electronic device and the context interaction processing identify the object (shirt 1910 shown on the display 140), performs a lookup or search for the object (e.g., using the Internet, a database of product placements, etc.) to recognize the object, and performs a further search if necessary to find further information.

Figure 20:
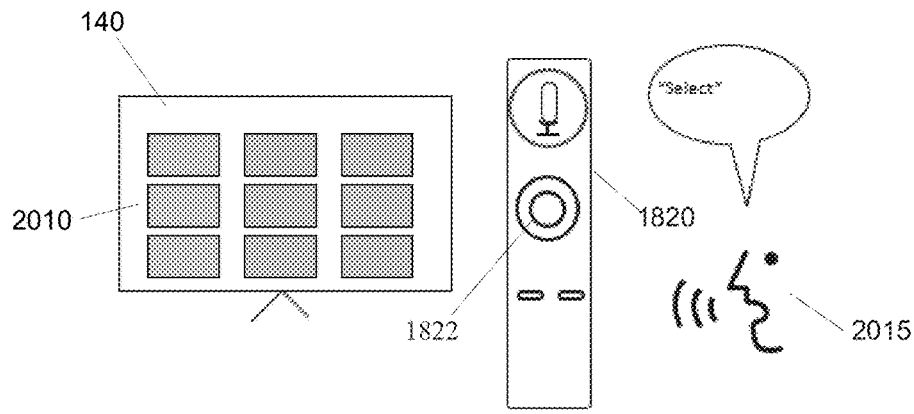
FIG. 20 shows an example of using demonstratives to add contextual intelligence to various activities, according to some embodiments.

FIG. 20 shows an example of using demonstratives to add contextual intelligence to various activities, according to some embodiments. Using the electronic device (e.g., electronic device 120) and the context interaction processing, demonstratives may be used to add contextual intelligence to various activities such as selection, exclusion, assignment, query, etc. In this example, a collection of selectable objects (e.g., content elements) 2010 are shown on a display 140. The user uses a controlling device 1820 with microphone selection 1821 and provides the utterance 2015 of "Select."

Figure 21A:
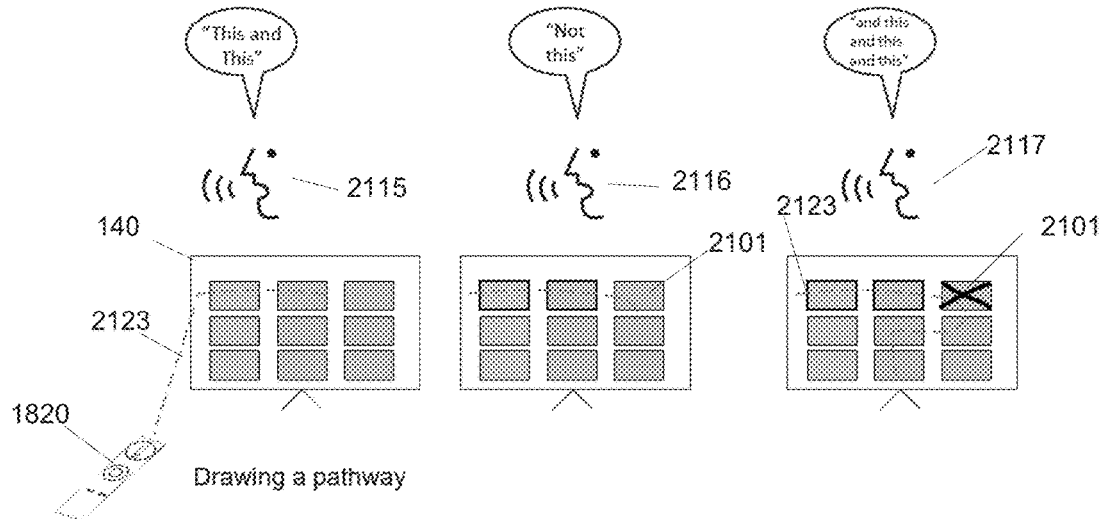
FIGS. 21A-B shows an example of selection of content but excluding elements from the selection in real time using voice control, according to some embodiments.
Figure 21B:
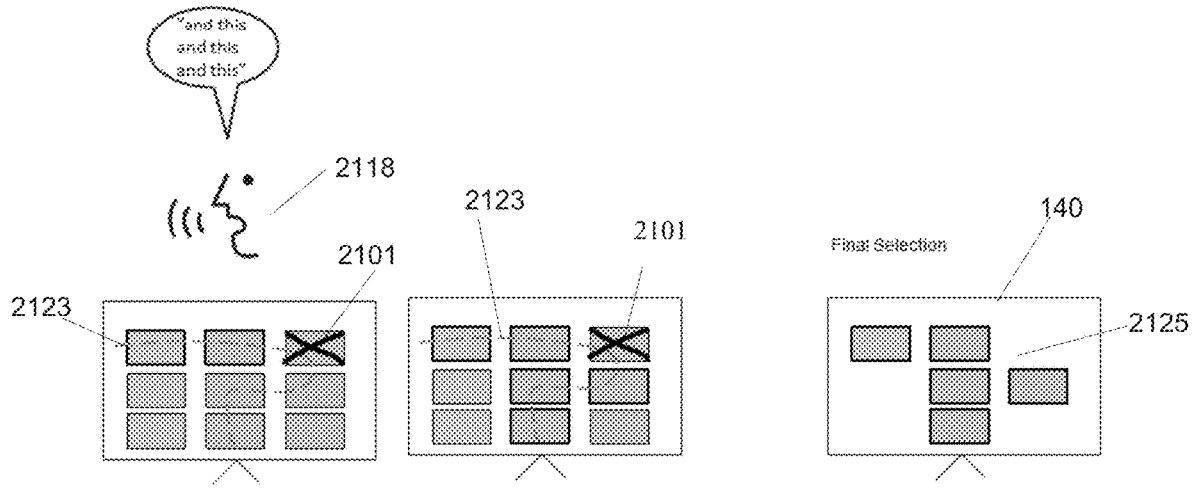

FIGS. 21A-B shows an example of selection of content but excluding elements from the selection in real time using voice control, according to some embodiments. Once the utterance 2015 (FIG. 20) is provided, the controlling device 1820 may be used to select a pathway 2123 with the utterance 2115 to combine the utterance 2915 of "Select" with the utterance 2115 of "This and This," the utterance 2116 of "Not this," and the utterance 2117 of "and this and this and this." The utterance 2116 excludes object 2101 along the pathway 2123. The final selection 2125 is then left on the display 140.

Figure 22:
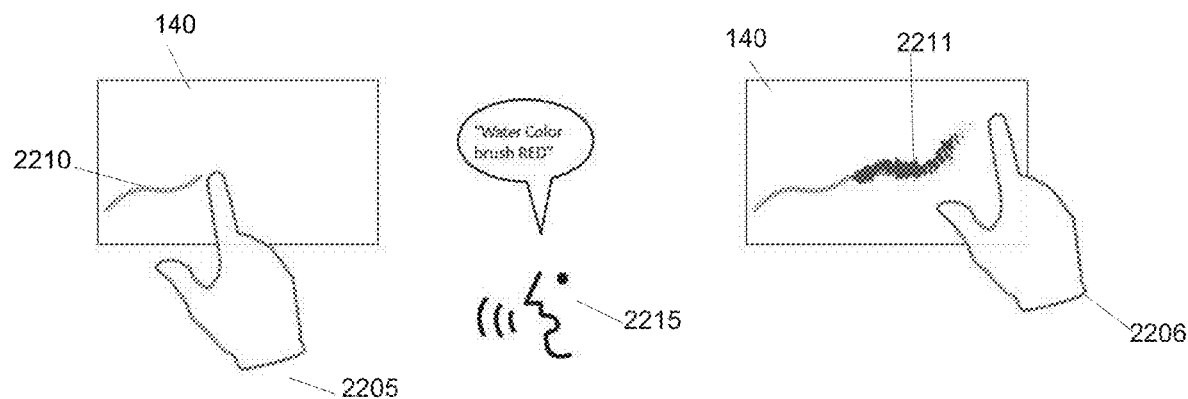
FIG. 22 shows an example of uninterrupted, real-time modification of interaction properties, according to some embodiments.

FIG. 22 shows an example of uninterrupted, real-time modification of interaction properties, according to some embodiments. In this example, the electronic device (e.g., electronic device 120) and the context interaction processing use Voice+Touch inputs. In this example embodiment, a drawing application executing on the electronic device is presented on the display 140. The user has drawn a curved line 2210 using the drawing application. When the user wants to change, for example, both a drawing tool and painting color, they may achieve that by touching the screen with gesture 2205 at a position where they want to draw, and simultaneously issue the utterance 2215 stating "Water color brush RED." The user does not have to go to separate pallets to change the color and the tool. The context interaction processing provides the drawing 2211 with the new color and different drawing shape as the user moves their finger with gesture 2206.

Figure 23A:
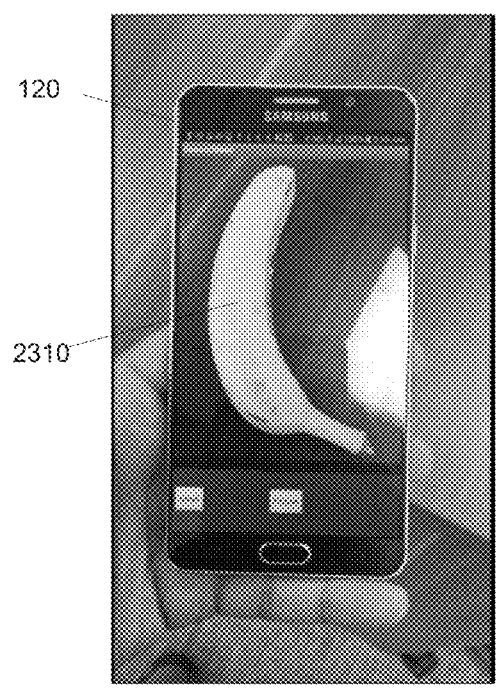
FIGS. 23A-B shows an example of voice plus computer vision, according to some embodiments.
Figure 23B:
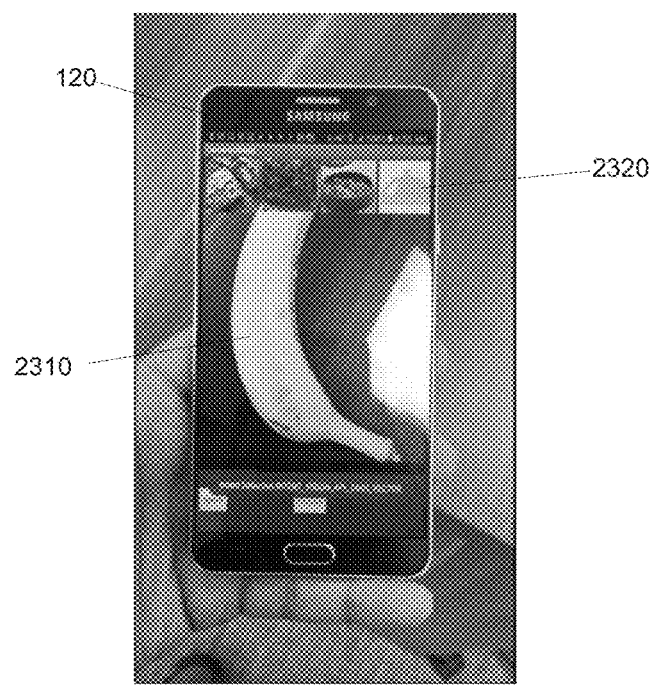

FIGS. 23A-B shows an example of voice plus computer vision, according to some embodiments. In this example, the electronic device (e.g., electronic device 120) and the context interaction processing use Voice+Vision inputs. As described above, using context as a way to disambiguate among on screen UI elements (virtual objects). In some embodiments, context may be used to extend the concept to physical objects. There are several scenarios in the day-to-day life of a user where their interaction with a physical object initiates a virtual interaction within an electronic device. For example, when the user finishes a large bottle of tea in their refrigerator, they may invoke the voice assistant on their electronic device 120 and ask to order a six pack of the same. Although interaction with the physical object invokes virtual interaction, the former does not in any way help with or enhance the latter.

With the prevalence of cameras on many smart devices in the home, improved computational capability of the electronic device and the camera becomes a viable additional modality for providing visual context for voice input. Advances in the fields of computer vision, machine learning and deep learning allow detection and labeling of objects within view of the camera. This capability may provide rich additional context that may be used with voice input. As shown, the user uses the camera 128 of the electronic device 120 to show an object (banana) 2310 in the display and ask a voice assistant "What can I cook with this?" and the context interaction processing would detect the object 2310 on the scene, make use of keywords in the utterance command ('cook' and 'this') and natural language processing to determine what the user's intention is. The electronic device 120 then shows information 2320 as a series of recipe in text or videos that the user may select to view or watch. The electronic device 120 may make use of other information about the user such as history, location, items available in, for example, a smart refrigerator, upcoming events on a calendar application, etc., to appropriately adjust its recommendations to better suit the user's life. The electronic device 120 may use a combination of the list of objects detected in its view, their relative sizes and the context of the command to determine the most likely object that the user is directing their command to. In situations when multiple objects of varying types are visible in the view (e.g., carrots and tomatoes), the electronic device 120 may interact with the user via speech synthesis to disambiguate the selection.

FIGS. 24A-B shows another example of voice plus computer vision, according to some embodiments. Using voice plus computer vision, some embodiments may be used for online shopping. For example, if the user had just finished the last tea bag, they can point the box 2410 (or packaging) at a camera (e.g., camera 128) of an electronic device (e.g., electronic device 120) and say the utterance "add a couple of these to my AMAZON® cart" or "Buy this" 2405. The context interaction processing performs label matching with AMAZON®'s database, identifies the product and adds it to the cart. As shown, display 140 then displays the items purchased 2420 and provides further information 2406. In some embodiments, natural language processing is used to determine how many (e.g., a couple) to add to the cart. In other embodiments, the electronic device 120 may interact back and forth with the user via speech synthesis to obtain more exact details about the order such as desired date of delivery, address of delivery etc.

FIGS. 25A-B shows yet another example of voice plus computer vision, according to some embodiments. In one example, a user may point to a brochure 2520 for a local museum exhibit and say the utterance of "add this to my calendar." The electronic device (e.g., electronic device 120, FIG. 2) using the context interaction processing performs OCR on the frame 2510 to read the text details on the brochure 2520, performs language processing to determine details 2525 such as time and date, and adds this event to the corresponding time and date in the calendar app of the electronic device or over multiple devices. In all of these scenarios that involve voice+vision, the question might arise as to how does the electronic device 120 know when to use the camera for an input. When voice input begins, the electronic device 120 looks to see if there is engagement in any of the other input, such as hover, cursor, point touch, etc.

When none of these other input modalities are engaged with, it then decides to use the camera output to check if any vision based information was being conveyed by the user.

Figure 26:
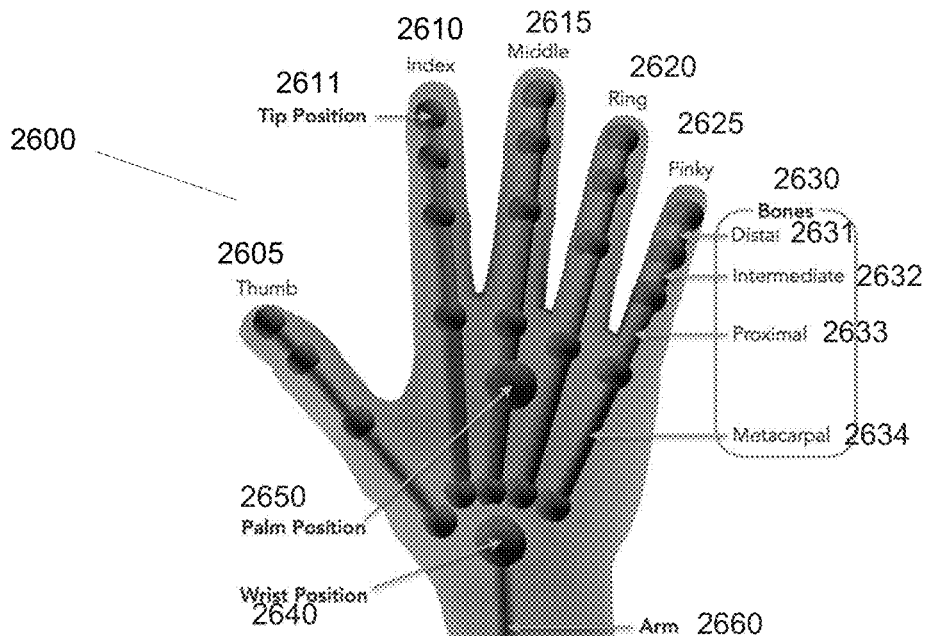
FIG. 26 shows an example of using tracked points using, for example, LEAP MOTION® hand tracking, according to some embodiments.

FIG. 26 shows an example of tracked points using, for example, LEAP MOTION® hand tracking, according to some embodiments. In some embodiments, visual disambiguation for multiplicity of matches is performed using an electronic device and the context interaction processing. Classification based on part of the body (e.g., hand 2600) is possible using computer vision to differentiate between different parts of the body such as the fingers (index 2610, middle 2615, ring 2620 and pinky 2625), thumb 2605, the palm position 2650 and the wrist position 2640. Additionally, positions of different bones 2630 (e.g., distal 2631, intermediate 2632, proximal 2633 and metacarpal 2634), tip position 2611 and arm 2660 may be differentiated as well.

Figure 27A:
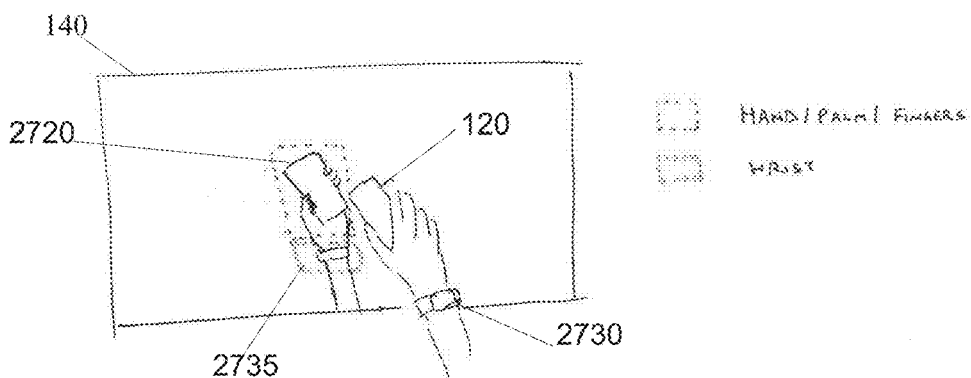
FIGS. 27A-B shows an example of a detected device that overlaps with the palm/fingers and another electronic device, according to some embodiments.
Figure 27B:
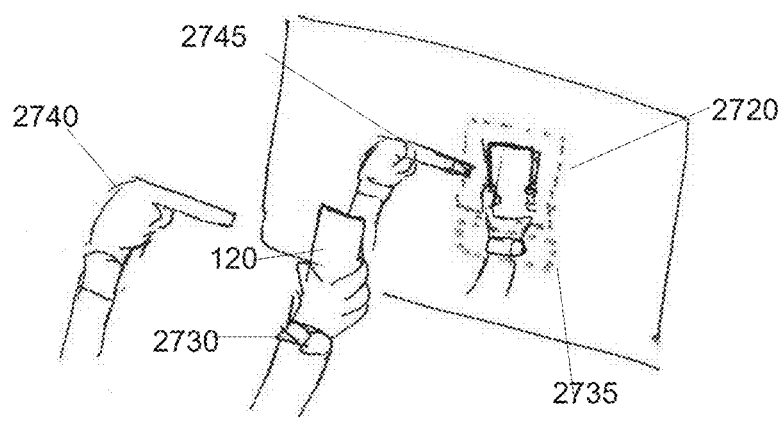

FIGS. 27A-B shows an example of a detected device that overlaps with the palm/fingers and another electronic device, according to some embodiments. In this example, the user is wearing a smart watch 2730 and holding an electronic device 120 (e.g., a smart phone), and says "order me this" (meant to buy the phone). Considering that each of the three devices involved in this scenario, the display 140, the smart watch 2730 and the electronic device 120 (e.g., a smart phone) are smart devices, they might each be running an intelligent assistant of their own. As a result, they might all start listening to a user's voice command as they start speaking. But, only device 140 supports the usage of demonstratives such as 'this' due to the visual disambiguation it supports by combining voice with the camera. Therefore, the voice command is only completed by device 140, whereas the other devices do not. Because the camera (e.g., camera 128, FIG. 2) has a wide lens and there could potentially be many matching items in the same scene, it becomes important to provide specific means to visually disambiguate the item of interest. The specific case considered is that of a user wearing a smart watch 2730 and holding the electronic device 120 (e.g., a smart phone) in their hand and commanding to the device, for example "Can you order this?" In this example, the user needs to express to the context interaction processing that the item they are interested in ordering is the electronic device 120 (smart phone) and not the smart watch 2730.

When the context interaction processing detects the electronic device 120 and the smart watch 2730 on the screen 140 using the camera device (e.g., camera 128, FIG. 2), the context interaction processing can also estimate which among the devices overlaps with the area of the palm or fingers 2720 (as opposed to overlapping with the wrist region 2735). By default, the context interaction processing may assume that the user would hold an object they are trying to order and thereby go with the electronic device 120 (smart phone) as the item of interest and order the same.

As shown in FIG. 27B, further identification based on what the user points to with the other hand. In this embodiment, the context interaction processing detects the pointing direction 2745 of the index finger of the other hand 2740 and detects which item it points to/overlaps with and use that as a way of identifying the target item.

Figure 28A:
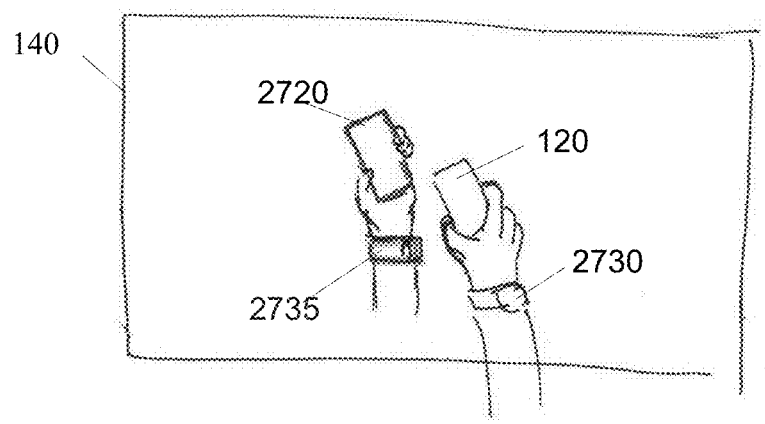
FIGS. 28A-C shows an example of identifying all items in a scene and explicitly providing for selection or disambiguation, according to some embodiments.
Figure 28B:
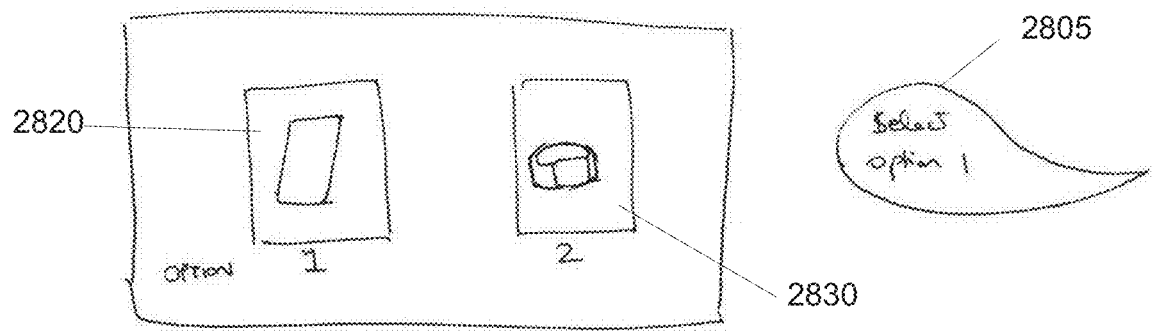
Figure 28C:
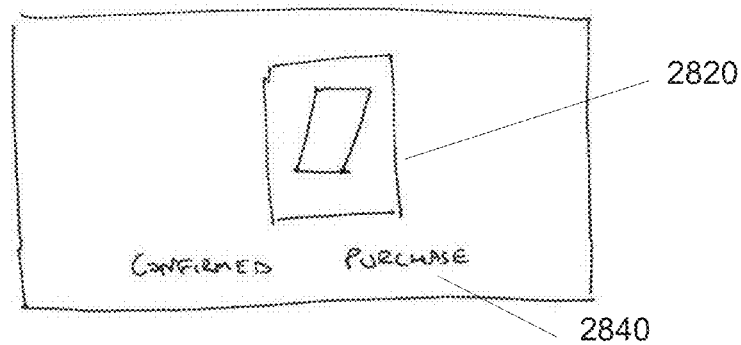

FIGS. 28A-C shows an example of identifying all items in a scene and explicitly providing for selection or disambiguation, according to some embodiments. Some embodiments provide for explicit selection in a second action. In this example, the context interaction processing identifies all the items in a scene and explicitly allows for selection or disambiguation by the user in a second action via voice or other input modalities. As shown, the user is holding an electronic device 120 in their hand and is wearing a smart watch 2730. The context interaction processing using an electronic device (e.g., electronic device 120, FIG. 2) and camera (e.g., camera 128), determines the captured electronic device 120 (smart phone) and palm and fingers position 2720, and wrist position 2735 shown on display 140. The context interaction processing identifies the smart phone 2820 as a first object, and the smart watch 2830 as the second object as options 1 and 2. A voice utterance 2805 is received by the microphone (e.g., microphone 122). For example, the utterance 2805 may be "select option 1." The context interaction processing may then show option 1 including the smart phone 2820 and provides further selections 2840, for example in a shopping scenario, confirmed purchase.

Figure 29:
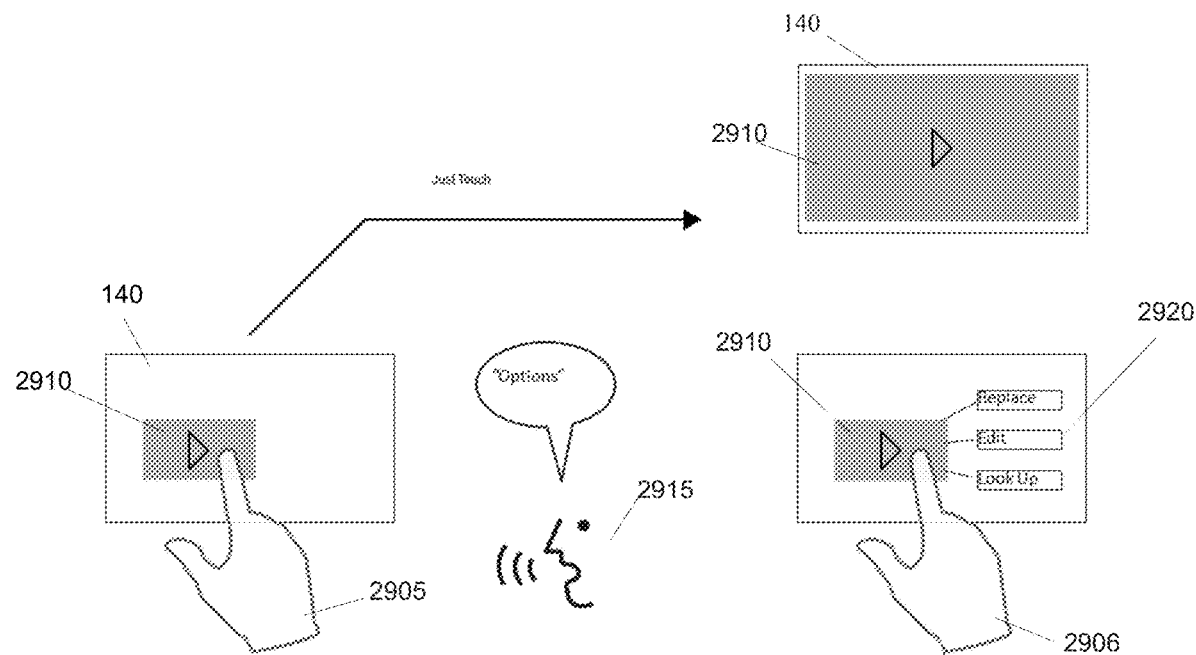
FIG. 29 shows an example of using voice input, along with two gestural input technologies, according to some embodiments.

FIG. 29 shows an example of using voice input, along with two gestural input technologies, according to some embodiments. In this example, the electronic device (e.g., electronic device 120) and the context interaction processing use Voice+Hover+touch inputs. In this example embodiment, besides the voice input, two gestural input technologies provide additional context. One of the two gestural inputs serve as the primary input and other serves as the secondary input. When a user views an object such as a video file, they can use the primary input—touch in this particular case to tap on a video on a touch screen and have it start playing. In the event that the user does not know enough about the video file, they can hover over the video and use voice in order to see more options for the tasks they can perform on it. This way of using hover+voice as a secondary input provides more information only when the user requests it, but does not get in the way when the user already knows what to do. As shown, once the user uses a gesture 2905 (e.g., touch on input mechanism (touch screen) 124, FIG. 2) on a content element 2910 (e.g., a video file), the content element may just be played based on gesture 2905, or the user may elect to issue an utterance 2915 of, for example, "options" along with a second gesture 2906 of hovering over the content element 2910. The result is displaying options 2920 associated with the content element 2910.

Figure 30:
FIG. 30 shows an example of disambiguation between multiple voice enabled devices, according to some embodiments.

FIG. 30 shows an example of disambiguation between multiple voice enabled devices, according to some embodiments. With the fast adoption of voice (virtual) agents and their addition to many smart electronic devices in the home, their prevalence in a multitude of devices in the home is inevitable. Voice input, although great for a very many tasks, is not well suited for spatial selection. Performing spatial tasks with voice input conventionally remains, at best, an awkward and cumbersome experience. In one example embodiment, a cluster of voice enabled displays are kept together, such as in the case of a group of smart digital picture frames (smart picture frames 3010, 3020, 3030 and 3040) set up on a wall for décor. When the user stands in front of this cluster of displays and speaks out a voice command (e.g., "switch to my wedding album"), conventionally there is no clear way of determining which device the user intended to target their command to. Users could potentially use ways of disambiguating between these devices by mentioning the device's name in addition to their voice command. While this can work, this puts the burden of remembering the device names or other identification on the user. Another option is that the name of the user can be displayed on each display, but still the need to have to read the name of a display, speak it back and then follow up with the voice commands is unintuitive and cumbersome. It should be noted that conventionally the user has to repeat this device name every single time.

In some embodiments, providing context via an additional modality is a quicker way of targeting commands to a specific device. A block-to-speak model may be used for disambiguation among a cluster of displays. Each device in the cluster may be setup with an inexpensive sensor, such as Infra-red, time of flight, a camera, etc., that detects obstructions in the area immediately in front of the electronic device. In some embodiments, the user performs an action—blocking 3005 the sensor (without touching) on a smart digital picture frame 3030 to engage with that electronic device and speak voice commands to the blocked device. Only the device that has its sensors blocked within a threshold (e.g., one inch away, two inches away, five inches away, etc.) will open a microphone and listen for an utterance from the user. The neighboring devices either do not listen or do not process the voice input even though they are close enough to hear the user. This example may be used as a way of targeting speech input to an intended device.

Alternate embodiments may include other modalities such as touch or pointing with a remote control or controlling device maybe used as effective alternatives to blocking to achieve the same effect mentioned above. In some embodiments, blocking a sensor of a display with pointing from afar may be employed to result in a point-to-speak interaction model. The user points their hands at an electronic device and starts speaking. The voice commands target the pointed to device. This may be achieved using, for example, a KINECT® or similar type of camera that detects the human, their arm orientation and use that direction to determine which electronic device it is pointed to via a pre-calibrated map.

Figure 31:
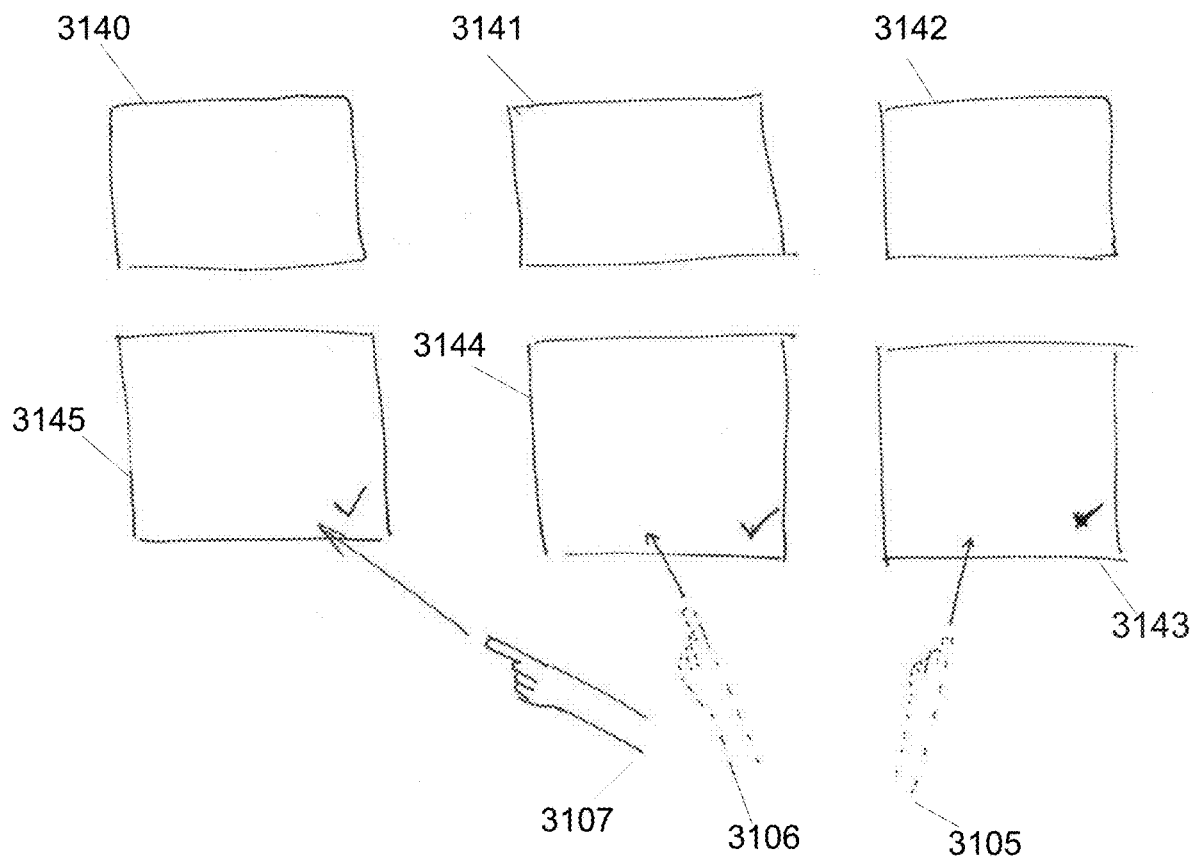
FIG. 31 shows an example of using demonstratives in combination with physical gestures, according to some embodiments.

FIG. 31 shows an example of using demonstratives in combination with physical gestures, according to some embodiments. In some embodiments, instead of voice input being available on each individual device, a central hub handles voice input for all the electronic devices in a cluster of devices. In one example, a user walks up and start speaking to the cluster as a whole, but use demonstratives in combination with physical gestures just as blocking/pointing only while targeting to a particular display. This allows emanating batch commands. As shown, the electronic devices 3140, 3141, 3142, 3143, 3144 and 3145 (e.g., electronic devices 120) make up a cluster. The user issues an utterance of "load Anna's daughter pictures on this, this, and this" with each utterance of 'this' pointing to/blocking a different display in the cluster. Here, the user provides an utterance of "this" with a gesture 3105 pointing to electronic device 3143, with a gesture 3106 pointing to electronic device 3144 and with a gesture 3107 pointing to electronic device 3145. The result is displaying the intended photos (e.g., of Anna's daughter) on the intended electronic devices (electronic devices 3143, 3144 and 3145).

Figure 32:
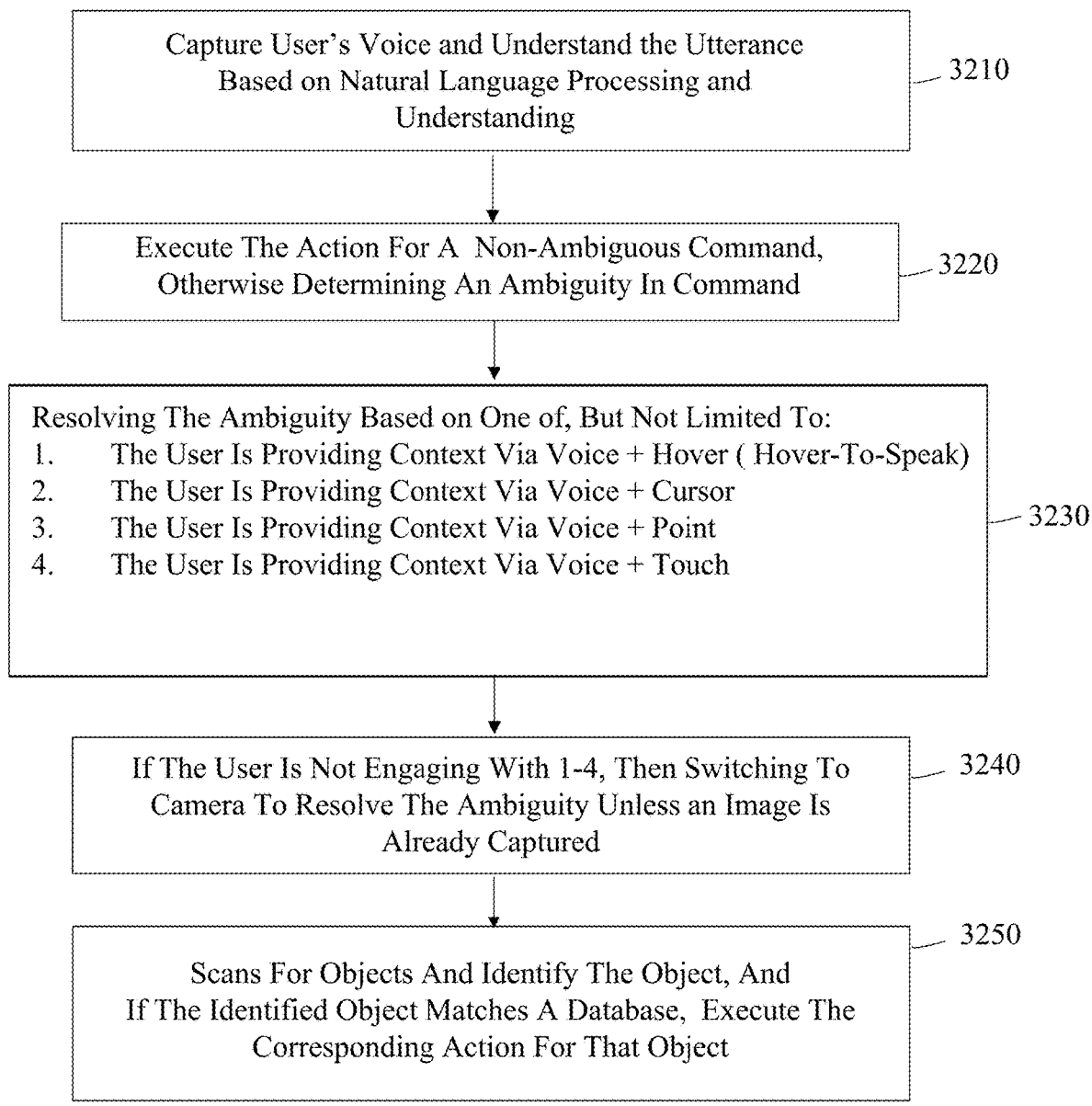
FIG. 32 shows a block diagram of a process for using demonstrables for cues, according to some embodiments.

FIG. 32 shows a block diagram of a process 3200 for using demonstrables for cues, according to some embodiments. A sequence of logical steps provides cues to the voice assistant to use image data when appropriate. In block 3210, a user speaks a voice command (e.g., to an electronic device 120 (FIG. 2) having a microphone 122) that is captured, sent to a natural language processing system (e.g., a voice recognition program, virtual agent, an artificial intelligence (AI) system, etc.), and a text transcription of the voice command is received by context interaction processing (e.g., using system 100 (FIG. 2), device 120, context interaction app 129 or any combination thereof). The processed command is received back by the electronic device with tags (action, date, time, application to use, etc.). In block 3220 if the subject of the command is clear, the electronic device proceeds to execute the action. Conversely, if the subject of the command is a demonstrable such as "this" or "these," it does not have sufficient information to execute the command (i.e., the electronic device knows what action to perform, but not on whom or what to perform it on). In block 3230, process 3200 resolves the ambiguity based on one of but not limited to, the following demonstrables (i.e., the electronic device knows the following demonstrables are the possible scenarios):

1. The user is providing context via voice+hover (hover-to-speak)
2. The user is providing context via voice+cursor
3. The user is providing context via voice+point
4. The user is providing context via voice+touch.

In block 3240, if the system does not detect any of the modalities listed in 1-4 (e.g., hand not within tracking area, hand not touching screen, pointer not within screen space, etc.), the electronic device determines that context provided via the camera (e.g., camera 128) may be the option (i.e., the camera is the medium used for context). The electronic device using context interaction processing switches to the camera (unless an image is already captured) for an additional modality to resolve what 'this' means. In block 3250, the electronic device activates the camera (if no image is already present), takes a picture, scans for objects and identifies the objects. If the identified object is recognized (e.g., matches an element in a database, etc.) the electronic device executes the corresponding action for that object.

Figure 33:
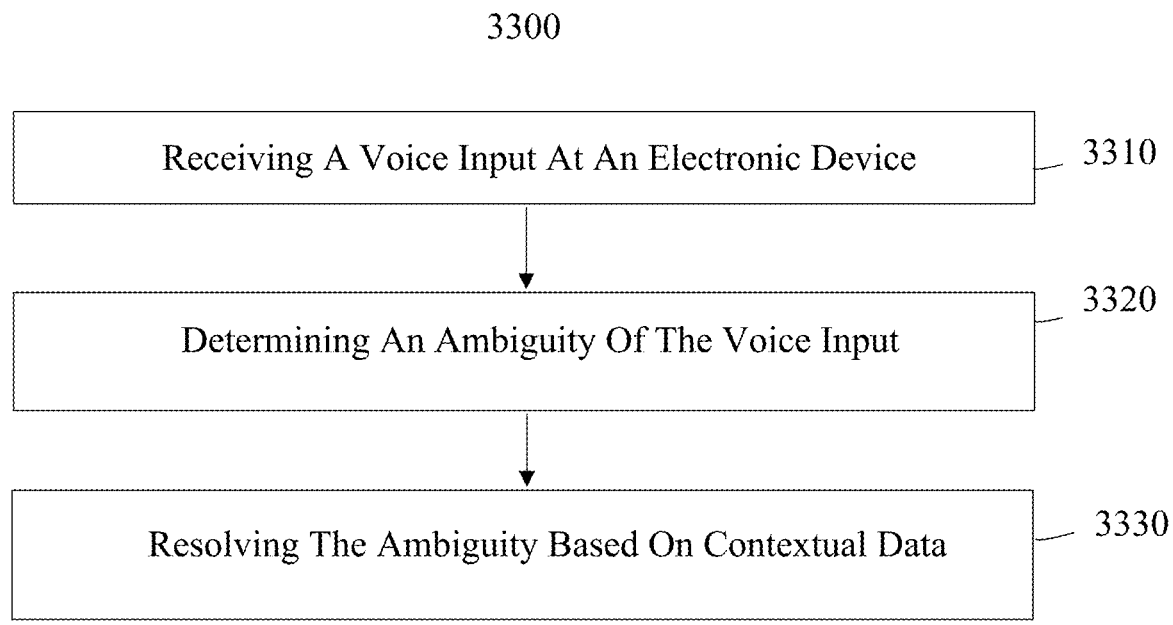
FIG. 33 shows a block diagram of a process for context interaction, according to some embodiments.

FIG. 33 shows a block diagram of a process 3300 for context interaction, according to some embodiments. In block 3310, a voice input is received at an electronic device (e.g., electronic device 120, FIG. 2). In block 3320, an ambiguity of the voice input is determined (e.g., a voice utterance of "this" or "that"). In block 3330, the ambiguity is resolved based on contextual data (e.g., within device disambiguation: Voice+Hover, Voice+Cursor, Voice+Point, Voice+Touch, Voice+Show, or combinations thereof). In some embodiments, the contextual data includes at least one of: an image (e.g., on a display 140), a non-voice input (e.g., a gesture, a pointer of a pointing device, a touch on a touch screen (e.g., input mechanism 124), or a combination thereof.

In some embodiments, in process 3300 the ambiguity relates to identification of an object or a position that the voice input applies to. The image may be captured by a camera (e.g., camera 128, FIG. 2) connected to the electronic device, displayed on a display device (e.g., display 140), or a combination thereof. In process 3300, the non-voice input may be sensed by at least one sensor (e.g., input mechanism 124) connected to the electronic device.

In some embodiments, process 3300 may further include resolving the ambiguity by determining identification of the object based on the image containing the object (e.g., captured by a camera 128), or the non-voice input indicating the object (e.g., a hand or finger gesture, a pointer from a pointing device, a touch, a hover, etc.). In process 3300, the ambiguity may include a demonstrative determiner (e.g., terms like 'this' or 'that', see, e.g., FIGS. 19A-B, FIG. 20, FIG. 31), and the contextual data further includes information affecting an action applicable to the object (e.g., apply a setting, etc.).

In some embodiments, process 3300 may further include resolving the ambiguity by enabling the camera upon a determination that no non-voice input occurred (e.g., no occurrence of: the user providing context via voice+hover (hover-to-speak), the user providing context via voice+cursor, the user providing context via voice+point, the user providing context via voice+touch, etc.).

In some embodiments, in process 3300 the object may be the electronic device (itself), and the electronic device adjusts an interface corresponding to the voice input with the ambiguity resolved. Process 3300 may include that the action applicable to the object includes: receiving information (e.g., information about the object from an Internet search), assisting with a purchase (e.g., finding the object or similar object for sale on-line, adding to a virtual shopping cart, etc.), calendaring an event (e.g., using a calendaring app on the electronic device(s)), applying features to content (e.g., applying settings, copying and pasting settings to an object, etc.), selecting at least one content associated with the object (e.g., selecting a photo from a gallery of photos, etc.), moving the object on a display (e.g., picking up, dragging, dropping, etc.), or a combination thereof.

Figure 34:
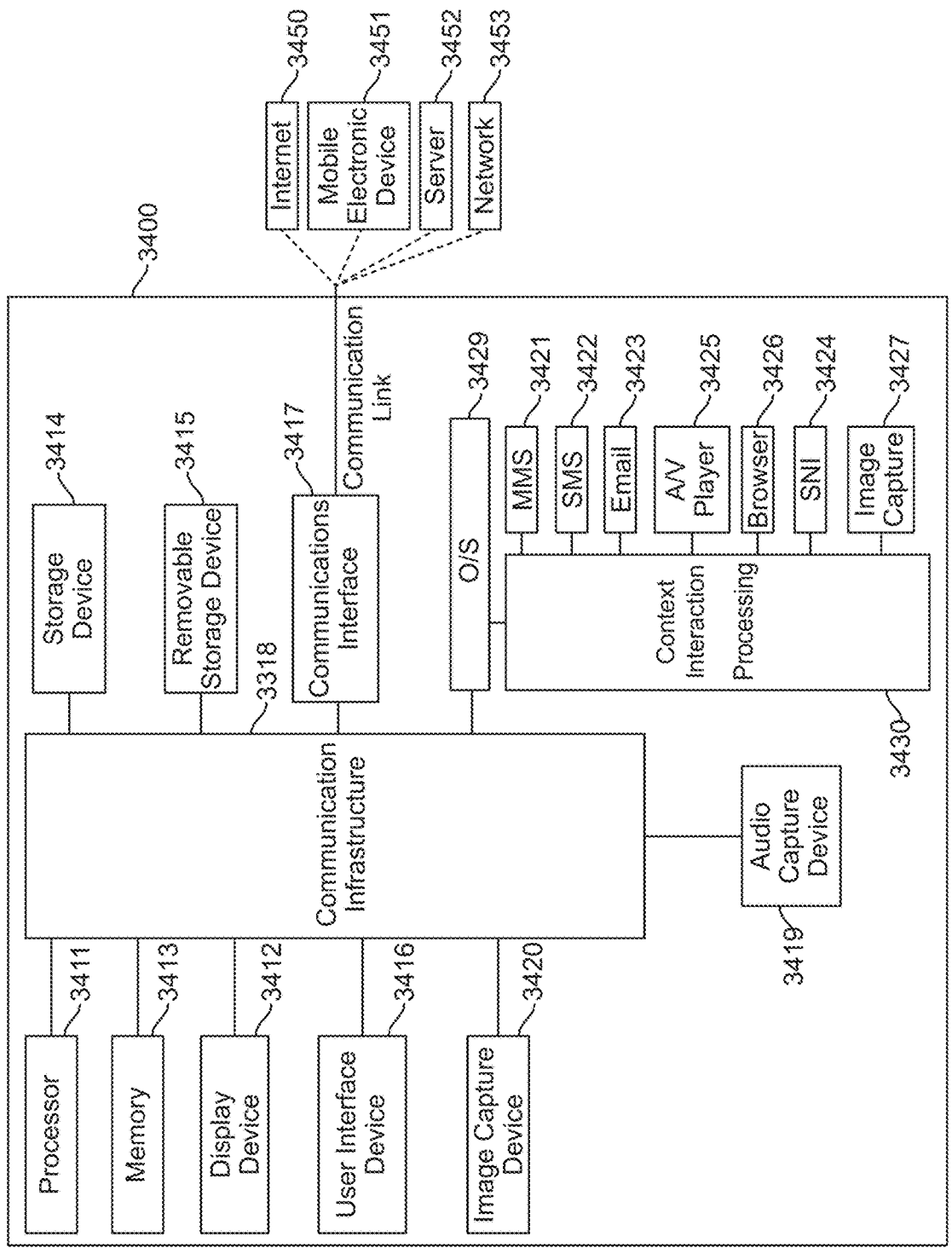
FIG. 34 is a high-level block diagram showing an information processing system comprising a computing system implementing one or more embodiments.

FIG. 34 is a high-level block diagram showing an information processing system comprising a computing system implementing one or more embodiments. The system 3400 includes one or more processors 3411 (e.g., ASIC, CPU, etc.), and may further include an electronic display device 3412 (for displaying graphics, text, and other data), a main memory 3413 (e.g., random access memory (RAM), cache devices, etc.), storage device 3414 (e.g., hard disk drive), removable storage device 3415 (e.g., removable storage drive, removable memory, a magnetic tape drive, optical disk drive, computer-readable medium having stored therein computer software and/or data), user interface device 3416 (e.g., keyboard, touch screen, keypad, pointing device), and a communication interface 3417 (e.g., modem, wireless transceiver (such as Wi-Fi, Cellular), a network interface (such as an Ethernet card), a communications port, or a PCMCIA slot and card).

The communication interface 3417 allows software and data to be transferred between the computer system and external devices through the Internet 3450, mobile electronic device 3451, a server 3452, a network 3453, etc. The system 3400 further includes a communications infrastructure 3418 (e.g., a communications bus, cross bar, or network) to which the aforementioned devices 3411 through 3417 are connected.

The information transferred via communications interface 3417 may be in the form of signals such as electronic, electromagnetic, optical, or other signals capable of being received by communications interface 3417, via a communication link that carries signals and may be implemented using wire or cable, fiber optics, a phone line, a cellular phone link, a radio frequency (RF) link, and/or other communication channels.

In one implementation of one or more embodiments in a mobile wireless device (e.g., a mobile phone, tablet, wearable device, etc.), the system 3400 further includes an image capture device 3420, such as a camera 128 (FIG. 2), and an audio capture device 3419, such as a microphone 122 (FIG. 2). The system 3400 may further include application processing or processors as MMS 3421, SMS 3422, email 3423, social network interface (SNI) 3424, audio/video (AV) player 3425, web browser 3426, image capture 3427, etc.

In one embodiment, the system 3400 includes context interaction processing 3430 that may implement processing similar as described regarding context interaction app 129 (FIG. 2), processing for process 3200, and process 3300 as described above. In one embodiment, the context interaction processing 3430 along with an operating system 3429 may be implemented as executable code residing in a memory of the system 3400. In another embodiment, the context interaction processing 3430 may be provided in hardware, firmware, etc.

In one embodiment, the main memory 3403, storage device 3404 and removable storage device 3405, each by themselves or in any combination, may store instructions for the embodiments described above that may be executed by the one or more processors 3401.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface.

Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method, comprising:
receiving a voice input at an electronic device;
determining an ambiguity of the voice input;
resolving, by the electronic device, the ambiguity based on contextual data and determining identification of an object that the voice input applies to, wherein the electronic device is configured for resolving the ambiguity within a display device of the electronic device and within display devices of respective other electronic devices, the contextual data includes a captured image by a camera and user history information, and the ambiguity relates to the identification of the object that the voice input applies to; and
correlating the contextual data with the voice input for determining, based on the identification of the object, a selection of content, and for performing an action based on content type of the selected content,
wherein a combination of objects and their relative sizes are detected in the captured image, context of the voice input are used for determining the object that the voice input is directed to, resulting properties are transferable to at least one other selected content and comprise content settings that are applied to the at least one other selected content, the electronic device adjusts an interface corresponding to the voice input with the ambiguity resolved, the ambiguity includes a demonstrative determiner, and the contextual data further includes information affecting the action applicable to the object.

2. The method of claim 1, further comprising:
mapping the content with a set of action commands relevant to the content type for the selected content;
wherein the ambiguity relates to identification of a position that the voice input applies to, the contextual data further comprises a non-voice input that includes a non-touch hand gesture, the selection of the content comprises determining a selection for the content from a multi-hierarchical menu including a plurality of content, and the interface filters and reconfigures itself, using dynamic refinement, to elements that fit within a context of an executed action command from the set of action commands.

3. The method of claim 2, further comprising:
determining, by the electronic device, whether the voice input matches an action command from the set of action commands; and
selecting an app from a plurality of apps for performing the action;
wherein:
the app supports performing the action on the content;
the camera is one of coupled to the electronic device or attached to the display device that is coupled to the electronic device; and
the non-voice input further comprises at least one of: a pointer of a pointing device, a touch gesture, or a combination thereof.

4. The method of claim 3, wherein the non-voice input is sensed by at least one sensor coupled to the electronic device, and the contextual data further comprises locally available items for a user and user location information.

5. The method of claim 3, wherein the determining of the identification of the object is based on the captured image containing the object or the non-voice input indicating the object.

6. The method of claim 3, further comprising:
using output from the camera upon a determination that no non-voice input occurred with the voice input.

7. The method of claim 2, wherein the object is the electronic device.

8. The method of claim 1, wherein the action applicable to the object comprises one of: receiving information, assisting with a purchase, calendaring an event, applying features to content, selecting at least one content associated with the object, moving the object on the display device of the electronic device, moving the object on a particular display device of the display devices of the other electronic devices, or a combination thereof.

9. An electronic device comprising:
a memory storing instructions; and
at least one processor executing the instructions including a process configured to:
receive a voice input;
determine an ambiguity of the voice input;
resolve the ambiguity based on contextual data and determining identification of an object that the voice input applies to, wherein the electronic device is configured for resolving the ambiguity within a display of the electronic device and within displays of respective other electronic devices, the contextual data includes a captured image by a camera and user history information, and the ambiguity relates to the identification of the object that the voice input applies to; and
correlate the contextual data with the voice input for determining, based on the identification of the object, a selection of content, and for performing an action based on content type of the selected content,
wherein a combination of objects and their relative sizes detected in the captured image, context of the voice input are used for determining the object that the voice input is directed to, resulting properties are transferable to at least one other selected content and comprise content settings that are applied to the at least one other selected content, the electronic device adjusts an interface corresponding to the voice input with the ambiguity resolved, and the object is the electronic device.

10. The electronic device of claim 9, wherein:
the process is further configured to map the content with a set of action commands relevant to the content type for the selected content;
the ambiguity relates to identification of a position that the voice input applies to;
the contextual data further comprises a non-voice input that includes a non-touch hand gesture;
the camera is one of coupled to the electronic device or attached to the display device that is coupled to the electronic device;

the selection of the content comprises determining a selection for the content from a multi-hierarchical menu including a plurality of content; and the interface filters and reconfigures itself, using dynamic refinement, to elements that fit within a context of an executed action command from the set of action commands.

11. The electronic device of claim 10, wherein:
the process is further configured to:
  determine whether the voice input matches an action command from the set of action commands; and
  select an app from a plurality of apps for performing the action;
the app supports performing the action on the content;
the non-voice input is sensed by at least one sensor coupled to the electronic device;
the non-voice input further comprises at least one of: a pointer of a pointing device, a touch gesture, or a combination thereof; and
the contextual data further comprises locally available items for a user and user location information.

12. The electronic device of claim 11, wherein:
the determining of the identification of the object is based on the captured image containing the object or the non-voice input indicating the object;
the ambiguity includes a demonstrative determiner; and
the contextual data further includes information affecting the action applicable to the object.

13. The electronic device of claim 11, wherein:
the process is further configured to:
  using output from the camera upon a determination that no non-voice input occurred with the voice input.

14. The electronic device of claim 12, wherein the action applicable to the object comprises one of: receiving information, assisting with a purchase, calendaring an event, applying features to content, selecting at least one content associated with the object, moving the object on the display device of the electronic device, moving the object on a particular display device of the display devices of the other electronic devices, or a combination thereof.

15. A non-transitory processor-readable medium that includes a program that when executed by a processor performing a method comprising:
  receiving a voice input at an electronic device;
  determining an ambiguity of the voice input;
  resolving the ambiguity based on contextual data and determining identification of an object that the voice input applies to, wherein the electronic device is configured for resolving the ambiguity within a display of the electronic device and within displays of respective other electronic devices, the contextual data includes a captured image by a camera and user history information, and the ambiguity relates to the identification of the object that the voice input applies to; and
  correlating the contextual data with the voice input for determining, based on the identification of the object, a selection of content, and for performing an action based on content type of the selected content,
  wherein a combination of objects and their relative sizes detected in the captured image, context of the voice input are used for determining the object that the voice input is directed to, resulting properties are transferable to at least one other selected content and comprise content settings that are applied to the at least one other selected content, the electronic device adjusts an interface corresponding to the voice input with the ambiguity resolved, and the object is the electronic device.

16. The non-transitory processor-readable medium of claim 15, wherein:
the method further comprises mapping the content with a set of action commands relevant to the content type for the selected content;
the ambiguity relates to identification of a position that the voice input applies to;
the contextual data further comprises-a non-voice input that includes a non-touch hand gesture;
the selection of the content comprises determining a selection for the content from a multi-hierarchical menu including a plurality of content;
the camera is one of coupled to the electronic device or attached to the display device that is coupled to the electronic device;
the non-voice input is sensed by at least one sensor coupled to the electronic device;
the contextual data further comprises locally available items for a user and user location information; and
the interface filters and reconfigures itself, using dynamic refinement, to elements that fit within a context of an executed action command from the set of action commands.

17. The non-transitory processor-readable medium of claim 16, wherein the method further comprises:
  determining, by the electronic device, whether the voice input matches an action command from the set of action commands;
  selecting an app from a plurality of apps for performing the action; and
  using output from the camera upon a determination that no non-voice input occurred with the voice input;
  wherein:
    the determining of the identification of the object is based on the captured image containing the object or the non-voice input indicating the object;
    the app supports performing the action on the content;
    the ambiguity includes a demonstrative determiner;
    the contextual data further includes information affecting the action applicable to the object;
    the action applicable to the object comprises one of: receiving information, assisting with a purchase, calendaring an event, applying features to content, selecting at least one content associated with the object, moving the object on the display device of the electronic device, moving the object on a particular display device of the display devices of the other electronic devices, or a combination thereof; and
    the non-voice input further comprises at least one of: a pointer of a pointing device, a touch gesture, or a combination thereof.

* * * * *